US012717863B2

(12) United States Patent
Kashimata et al.

(10) Patent No.: US 12,717,863 B2
(45) Date of Patent: Aug. 25, 2026

(54) CALCULATION DEVICE INCLUDING MULTIPLE CALCULATION CORES

(71) Applicant: KABUSHIKI KAISHA TOSHIBA, Tokyo (JP)

(72) Inventors: Tomoya Kashimata, Kawasaki (JP); Ryo Hidaka, Tokyo (JP); Masaya Yamasaki, Tokyo (JP); Yohei Hamakawa, Kawasaki (JP); Kosuke Tatsumura, Yokohama (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 1220 days.

(21) Appl. No.: 17/680,213

(22) Filed: Feb. 24, 2022

(65) Prior Publication Data

US 2023/0076906 A1 Mar. 9, 2023

(30) Foreign Application Priority Data

Sep. 3, 2021 (JP) ................................ 2021-143766

(51) Int. Cl.
*G06F 17/11* (2006.01)
*G06F 17/16* (2006.01)
(Continued)

(52) U.S. Cl.
CPC .............. *G06F 17/11* (2013.01); *G06F 17/16* (2013.01); *G06N 7/01* (2023.01); *G06N 7/08* (2013.01)

(58) Field of Classification Search
CPC .. G06N 7/01; G06N 7/08; G06F 17/11; G06F 17/16; G06F 9/5027
See application file for complete search history.

(56) References Cited

U.S. PATENT DOCUMENTS 10,817,304 B2 10/2020 Tatsumura et al.
11,093,581 B2 8/2021 Tatsumura et al.
(Continued)

FOREIGN PATENT DOCUMENTS

JP 2018-92325 A 6/2018
JP 2019-159566 A 9/2019
(Continued)

OTHER PUBLICATIONS

Bertsekas, D. P.—NPL: "Parallel and Distributed Computation: Numerical Methods" (Year: 1997).*
(Continued)

*Primary Examiner* — Andrew Caldwell
*Assistant Examiner* — Carlos Heberto De La Garza
(74) *Attorney, Agent, or Firm* — Finnegan, Henderson, Farabow, Garrett & Dunner, LLP

(57) ABSTRACT

A calculation device includes P calculation cores each connected to a network. The P calculation cores calculate N first variables representing position and N second variables representing momentum in N oscillators, sequentially for each time step from an initial time to an end time. The P calculation cores output values based on N first variables at the end time as values based on a solution of an optimization problem. The kth calculation core includes an interaction circuit configured to calculate, at each time step, M intermediate variables corresponding to M oscillators, based on N first variables at the previous time step. The interaction circuit includes an intermediate variable memory configured to store M intermediate variables under calculation. At each time step, the interaction circuit starts calculation of M intermediate variables before a receiving circuit completes reception of all of (N-M) first variables at the previous time step.

16 Claims, 29 Drawing Sheets

(51) Int. Cl.
*G06N 7/01* (2023.01)
*G06N 7/08* (2006.01)

(56) References Cited

U.S. PATENT DOCUMENTS

| | | | | |
|---|---|---|---|---|
| 11,256,779 | B2 * | 2/2022 | Kanao | G06F 17/16 |
| 12,523,915 | B2 * | 1/2026 | Kumar | G02F 1/37 |
| 2019/0087388 | A1 | 3/2019 | Venturelli et al. | |
| 2020/0089731 | A1 | 3/2020 | Tatsumura et al. | |
| 2021/0004238 | A1 | 1/2021 | Tatsumura et al. | |
| 2021/0182356 | A1 | 6/2021 | Sakai et al. | |
| 2021/0326407 | A1 | 10/2021 | Tatsumura et al. | |
| 2022/0019714 | A1 | 1/2022 | Endo et al. | |

FOREIGN PATENT DOCUMENTS

| | | | |
|---|---|---|---|
| JP | 2020-43887 | A | 3/2020 |
| JP | 2020-46887 | A | 3/2020 |
| JP | 2020-154524 | A | 9/2020 |
| JP | 2021-43667 | A | 3/2021 |
| WO | WO 2012/101833 | A1 | 8/2012 |

OTHER PUBLICATIONS

Wilmshurst, T.—NPL: “Designing Embedded Systems with PIC Microcontrollers” (Year: 2012).*

Tatsumura, K.—NPL: “Large-scale combinatorial optimization in real-time systems by FPGA-based accelerators for simulated bifurcation” (Year: 2021).*

Japan Patent Office, Decision to Grant a Patent in JP App. No. 2021-143766, 1 page, and machine translation, 2 pages (Jun. 27, 2024).

H. Goto, et al., “Combinatorial optimization by simulating adiabatic bifurcations in nonlinear Hamiltonian systems,” Science Advances 5:eaav2372, 8 pages (Apr. 19, 2019).

H. Goto, et al., “High-performance combinatorial optimization based on classical mechanics,” Science Advances 7:eabe7953, 9 pages (Feb. 3, 2021).

K. Tatsumura, et al., Scaling out Ising machines using a multi-chip architecture for simulated bifurcation, Nature Electronics, DOI:10.1038/s41928-021-00546-4, 10 pages (Mar. 2021).

K. Tatsumura, et al., Scaling out Ising machines using a multi-chip architecture for simulation bifurcation, Nature Electronics, DOI:10.1038/s41928-021-00546-4, 10 pages (Mar. 2021).

* cited by examiner

OPERATING TIME PER TIME STEP
N/P_c
M/P_c
L_comm
L_JX
L_TE
INPUT TO INTERACTION CIRCUIT
OUTPUT FROM INTERACTION CIRCUIT
OUTPUT FROM TIME EVOLUTION CIRCUIT
OUTPUT FROM TRANSMITTING CIRCUIT
INPUT TO RECEIVING CIRCUIT
OUTPUT FROM RECEIVING CIRCUIT
x1 TO xM
xM+1 TO x2M
x(P-1)M+1 TO xN
x(P-2)M+1 TO x(P-1)M
b1 TO bM
RETENTION IN BUFFER OF RECEIVING CIRCUIT

```
t =0
M = N / P
for(i = 1; i < (M+1); i++){
        b_i=0
        b'_i=0
}
for(ncycle = 0; ncycle < Nstep; ncycle++) {
        for( j = 1; j < (N+1); j++){
                if ( j < (M+1)){
                        //TIME EVOLUTION CALCULATION
                        y_j += b'_j
                        y_j += FX(x_j)
                        x_j += FY(y_j)
                        x'_j = dt * c * x_j
                }else{
                        x'_j = receive (RECEIVING CIRCUIT)
                }
                for(i = 1; i < (M+1); i++){
                        //MATRIX MULTIPLICATION
                        b_i += J_i,j*x'_j
                }
                if( j <= M      * (P-1)){
                        send (TRANSMITTING CIRCUIT, x'_j)
                }
        }
        t += dt;
        for( i = 1; i < (M+1); i++){
                b'_i = b_i
                b_i = 0
        }
}
```

38
40
b1 TO bM
64
AGGREGATION CIRCUIT
44
72
62-1
CUMULATIVE SUM CIRCUIT
70
62-M
60-1
60-M
66-L
66-1
68
XAL
X(A-1)L+1
PRODUCT-SUM CIRCUIT
32

FIG.27

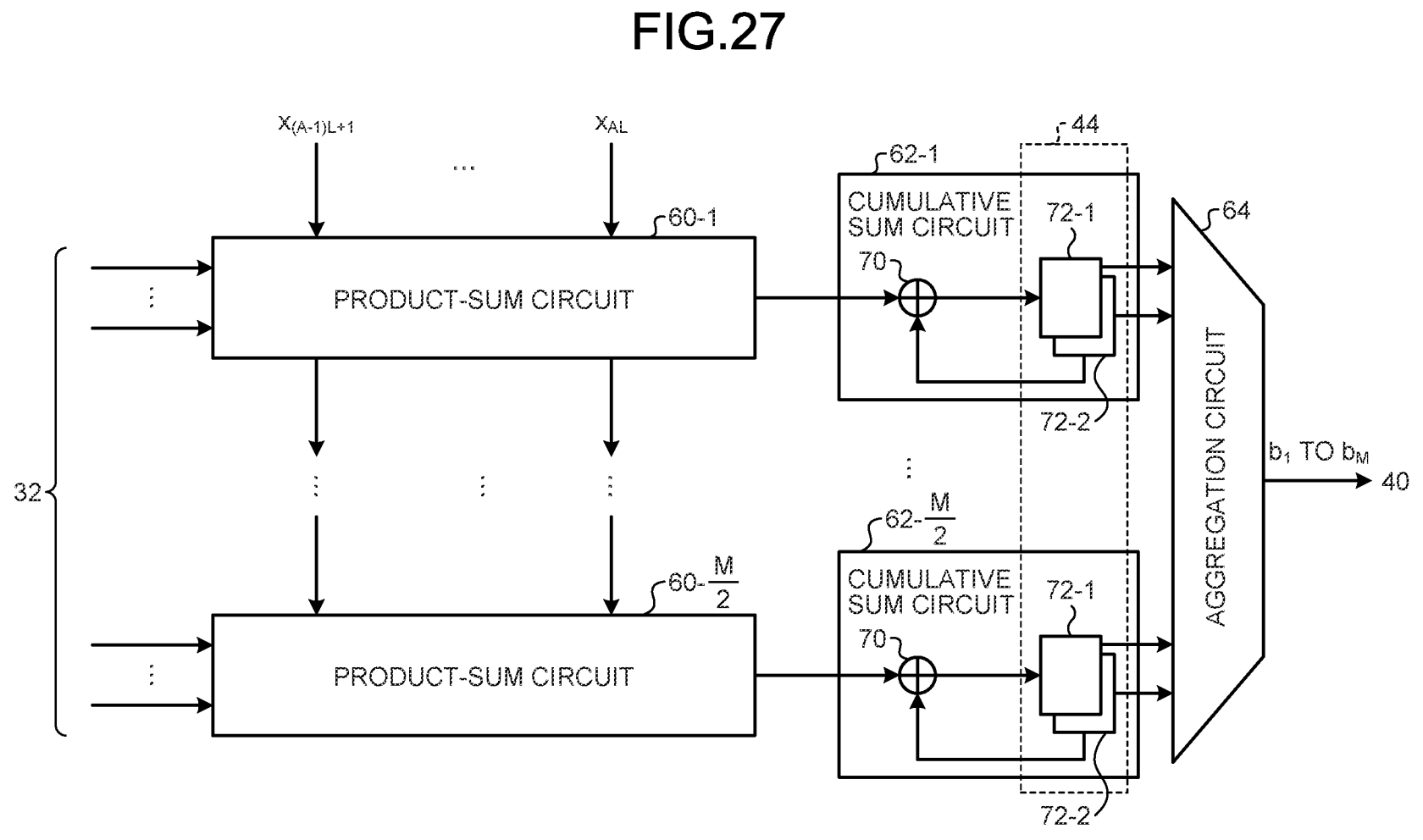

PRODUCT-SUM CIRCUIT
PRODUCT-SUM CIRCUIT
CUMULATIVE SUM CIRCUIT
CUMULATIVE SUM CIRCUIT
AGGREGATION CIRCUIT
$b_1$ TO $b_M$
$X_{AL}$
$X_{(A-1)L+1}$
60-1
$60\text{-}\frac{M}{2}$
62-1
$62\text{-}\frac{M}{2}$
70
72-1
72-2
44
64
40
32

CALCULATION DEVICE INCLUDING MULTIPLE CALCULATION CORES

CROSS-REFERENCE TO RELATED APPLICATIONS

This application is based upon and claims the benefit of priority from Japanese Patent Application No. 2021-143766, filed on Sep. 3, 2021; the entire contents of which are incorporated herein by reference.

FIELD

Embodiments described herein relate generally to a calculation device.

BACKGROUND

Optimization of complex systems in various application fields such as finance, logistics, control, and chemistry is often reduced to mathematical combinatorial optimization problems. Combinatorial optimization is the problem of finding a combination of discrete values that minimizes a discrete-variable function called a cost function.

In recent years, specific-purpose devices called an Ising machine to search for a ground state of an Ising spin model have attracted attention. The search for the ground state of the Ising spin model is called the Ising problem. The Ising problem is a combinatorial optimization problem of minimizing the Ising energy. The Ising energy is a cost function given by a quadratic function of Ising spins that are binary variables. The Ising machine can solve such Ising problems fast.

Many practical combinatorial optimization problems can be converted into Ising problems. Many practical combinatorial optimization problems can be solved fast using the Ising machine.

The Ising machine is implemented by hardware, for example, by a quantum annealer, a coherent Ising machine, and a quantum bifurcation machine. The quantum annealer implements quantum annealing using superconducting circuitry. The coherent Ising machine uses the oscillation phenomenon of a network formed with optical parametric oscillators. The quantum bifurcation machine uses a quantum-mechanical bifurcation phenomenon in a network of parametric oscillators having Kerr effect. While the Ising machine implemented by such hardware may achieve significant reduction of computation time, scale increase and stable operation are difficult.

A solution to the Ising problem can be calculated using computational resources such as widespread digital computers or operation circuits. Digital computers can be increased in scale and stably operated, compared with quantum annealers, coherent Ising machines, and quantum bifurcation machines. However, the Ising machines using computational resources are limited in calculation scale and calculation speed by the computational resources. In order to improve the calculation scale and the calculation speed of such Ising machines, computational resources have to be increased. Increasing the computational resources, however, is not easy due to many technical difficulties in, for example, semiconductor manufacturing processes.

On the other hand, Ising machines configured with a large number of computational resources using scale-out technology may be improved in performance depending on the number of computational resources. However, since the Ising machine configured with a large number of computational resources need to exchange information between the computational resources to perform calculations, the total calculation time is prolonged due to the communication overhead between the computational resources.

The problem to be solved by the present disclosure is to solve large-scale optimization problems fast while preventing the total computation time from being prolonged due to communication overhead.

BRIEF DESCRIPTION OF THE DRAWINGS

FIG. 23 is a diagram illustrating pseudocode describing the process by the calculation cores;

FIG. 27 is a diagram illustrating a configuration of the interaction circuit according to a second example;

DETAILED DESCRIPTION

Figure 1:
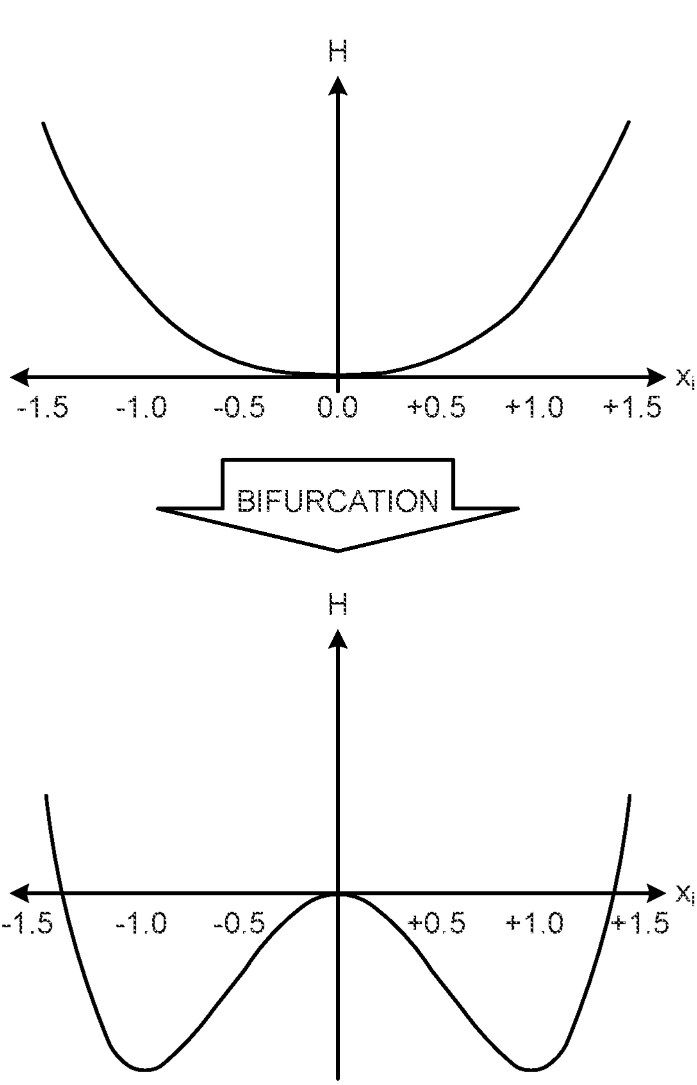
FIG. 1 is a diagram illustrating a bifurcation phenomenon of a simulated bifurcation algorithm.

According to an embodiment, a calculation device is configured to output a solution of an optimization problem with N discrete variables, where N is an integer equal to or greater than 2. The calculation device includes P calculation cores each connected to a network, where P is an integer equal to or greater than 2 and less than N. Each of the P calculation cores is exclusively assigned with some of N oscillators. The N oscillators correspond one-to-one with the N discrete variables and virtually change in position and momentum over time in one dimensional direction. The P calculation cores are configured to calculate N first variables representing the position and N second variables representing the momentum in the N oscillators, sequentially for each of time steps from an initial time to an end time. The P calculation cores are configured to output values based on the N first variables at the end time as values based on the solution of the optimization problem. A kth calculation core among the P calculation cores, where k is an integer equal to or greater than 1 and less than P, is assigned with M oscillators among the N oscillators, where M is an integer equal to or greater than 1 and less than N, and at each of the time steps, is configured to calculate M first variables corresponding to the assigned M oscillators among the N first variables and M second variables corresponding to the M oscillators. The kth calculation core includes: a receiving circuit configured to receive, at each of the time steps, N−M first variables at a previous time step calculated by P−1 calculation cores other than the kth calculation core among the P calculation cores, portion by portion sequentially, via the network; an interaction circuit configured to calculate, at each of the time steps, M intermediate variables corresponding to the M oscillators, based on the N first variables at the previous time step; a time evolution circuit configured to calculate, at each of the time steps, the M first variables and the M second variables at a target time step, based on the M first variables at the previous time step, the M second variables at the previous time step, and the M intermediate variables; and a transmitting circuit configured to transmit, at each of the time steps, the M first variables calculated by the time evolution circuit to the P−1 calculation cores via the network. The interaction circuit includes an intermediate variable memory configured to store the M intermediate variables under calculation. At each of the time steps, the interaction circuit is configured to start calculation of the M intermediate variables before the receiving circuit completes reception of all of the N−M first variables at the previous time step.

Combinatorial Optimization Problem

An Ising machine is an example of devices used for solving the Ising problem. Equation (1) defines the energy of the Ising model.

$$E = -\frac{1}{2}\sum_{i=1}^{N}\sum_{j=1}^{N} J_{i,j}s_i s_j - \sum_{i=1}^{N} h_i s_i \tag{1}$$

Here, $s_i$ and $s_j$ are spins. The spin is a binary variable that takes a value of either +1 or −1. $s_i$ is the ith spin of N spins. $s_j$ is the jth spin of N spins. i and j are an integer of 1 through N, both inclusive. N denotes the number of spins and is an integer equal to or greater than 2. h is an array of bias coefficient representing a force acting on each individual spin. $h_1$ is the bias coefficient representing a force acting on the ith spin. J is a matrix of coupling coefficient representing a force acting between two spins. J is an N×N real symmetric matrix in which diagonal components are zero. $J_{i,j}$ denotes a coefficient of an element at the ith row and jth column of J. In other words, $J_{i,j}$ is the coupling coefficient representing a force acting between the ith spin and the jth spin.

The Ising machine sets the energy E written by Equation (1) as an objective function and calculates a solution that makes the energy E as small as possible. The solution of the Ising model ($s_1$, $s_2$, . . . , $s_N$) in which the energy E has the minimum value is called optimal solution. However, the solution of the Ising model is not necessarily an optimal solution but may be an approximate solution in which the energy E is close to the minimum value. In other words, the Ising problem may be a problem to calculate not only an optimal solution but also an approximate solution.

A 0-1 combinatorial optimization problem with an objective function which is a quadratic function with a discrete variable (bit) taking either 0 or 1 is called a 0-1 quadratic programming problem. The discrete variable (bit) is converted into $s_1$ by using a computation of $(1+s_i)/2$. That is, it can be said that the 0-1 quadratic programming problem is equivalent to the Ising problem given by Equation (1). Therefore, the 0-1 quadratic programming problem can be converted into the Ising problem to be solved by the Ising machine.

Simulated Bifurcation Algorithm

Hayato Goto, Kosuke Tatsumura, Alexander R. Dixon, "Combinatorial optimization by simulating adiabatic bifurcations in nonlinear Hamiltonian systems", Science Advances, Vol. 5, no. 4, eaav2372, 19 Apr. 2019; and H. Goto, K. Endo, M. Suzuki, Y. Sakai, T. Kanao, Y. Hamakawa, R. Hidaka, M. Yamasaki, K. Tatsumura, "High-performance combinatorial optimization based on classical mechanics", Science Advances; 7, eabe7953", February 2021 propose a simulated bifurcation algorithm as an algorithm for solving a 0-1 combinatorial optimization problem. The simulated bifurcation algorithm can solve a large-scale 0-1 combinatorial optimization problem fast using an Ising model implemented by a digital computer. The simulated bifurcation algorithm also can solve a large-scale 0-1 combinatorial optimization problem fast with electronic circuitry such as a central processing unit (CPU), a microprocessor, a graphics processing unit (GPU), a field-programmable gate array (FPGA), an application specific integrated circuit (ASIC), or a combination circuit thereof.

The simulated bifurcation algorithm uses N first variables $x_i$ and N second variables $y_i$ corresponding to virtual N oscillators. In the simulated bifurcation algorithm, each of N oscillators represents a virtual particle having one degree of freedom. In other words, each of N oscillators virtually changes its position and momentum in one dimensional direction. N oscillators correspond one-to-one with N spins in the Ising problem. Therefore, N oscillators correspond one-to-one with N discrete variables of a combinatorial optimization problem. Both the first variable $x_i$ and the second variable $y_i$ are continuous variables represented by real numbers. The ith first variable $x_i$ denotes the position of the ith oscillator among N oscillators. The ith second variable $y_i$ denotes the momentum of the ith oscillator. i denotes an integer of 1 through N, both inclusive, and denotes an index that identifies each of N oscillators.

The basic simulated bifurcation algorithm numerically solves simultaneous ordinary differential equations in Equation (2) below for N first variables $x_i$ and N second variables $y_i$.

$$\frac{dx_i}{dt} = \frac{\partial H}{\partial y_i} = Dy_i \qquad (2)$$
$$\frac{dy_i}{dt} = -\frac{\partial H}{\partial x_i} = \left\{-D + p(t) - Kx_i^2\right\}x_i + f_i$$

H is the Hamiltonian in Equation (3) below.

$$H = \sum_{i=1}^{N}\left[\frac{D}{2}\left(x_i^2 + y_i^2\right) - \frac{p(t)}{2}x_i^2 + \frac{K}{4}x_i^4 - c\left(h_i x_i \alpha(t) + \frac{1}{2}\sum_{j=1}^{N} J_{i,j}x_i x_j\right)\right] \qquad (3)$$

The coefficient D is a predetermined constant and corresponds to detuning. The coefficient p(t) corresponds to pumping amplitude and its value monotonously increases according to the number of times of updating in calculation of the simulated bifurcation algorithm. The variable t represents time. The initial value of the coefficient p(t) may be set to 0. K is a predetermined constant and corresponds to a positive Kerr coefficient. K may be zero.

$f_i$ is an external force and given by Equation (4) below.

$$f_i = cb_i \qquad (4)$$
$$b_i = h_i\alpha(t) + \sum_{j=1}^{N} J_{i,j}x_j$$

In Equation (4), $b_1$ is given by a partial derivative of the expression inside the parentheses in Equation (3) with respect to the first variable $x_i$. The expression inside the parentheses in Equation (3) corresponds to the energy E of the Ising model.

c is a coefficient. c may be, for example, a constant determined in advance before calculation is performed. Furthermore, $\alpha(t)$ is a coefficient increasing with p(t).

The simulated bifurcation algorithm calculates the value of the spin $s_i$, based on the sign of the first variable $x_i$ after the value of p(t) is increased from an initial value (for example, 0) to a prescribed value. The simulated bifurcation algorithm calculates the value of the spin $s_i$, using the signum function, for example, in which when $x_i>0$, $sgn(x_i)=1$, and when $x_i<0$, $sgn(x_i)=-1$.

Computation of Simulated Bifurcation Algorithm

The simulated bifurcation algorithm solves differential equations given by Equation (2), Equation (3), and Equation (4) using the symplectic Euler method.

When the symplectic Euler method is used, the differential equations given by Equation (2), Equation (3), and Equation (4) can be written into a discrete recurrence relation given by Equation (5).

$$y_i(t + \Delta t) = y_i(t) + \left[\left\{-D + p(t) - Kx_i^2(t)\right\}x_i(t) + f_i(t)\right]\Delta t \qquad (5)$$
$$x_i(t + \Delta t) = x_i(t) + \Delta t D y_i(t + \Delta t)$$
$$f_i(t) = cb_i(t)$$

t is time. $\Delta t$ is a time step (unit time, time step size).

When the simulated bifurcation algorithm is performed, a digital computer or an electronic circuit such as an FPGA updates N first variables $x_i$ and N second variables $y_i$ sequentially for each time step from the initial time and alternately between the first variables $x_i$ and the second variables $y_i$, based on the algorithm in Equation (5). The digital computer or the electronic circuit such as an FPGA then binarizes the values of N first variables $x_i$ at the end time using the signum function and outputs the values of N spins.

Equation (5) is written using time t and time step $\Delta t$ in order to show the correspondence with the differential equations. However, when the symplectic Euler method is performed by a digital computer or an electronic circuit such as an FPGA, the algorithm for computing Equation (5) may not necessarily include time t or time step $\Delta t$ as explicit parameters. For example, when time step $\Delta t$ is 1, the algorithm for computing Equation (5) need not include time step $\Delta t$. For example, when time t is not included as an explicit parameter, the algorithm for computing Equation (5) performs a process with $x_i(t+\Delta t)$ as the updated value of $x_i(t)$. More specifically, the algorithm for computing Equation (5) performs a process using "t" as a parameter that identifies a variable at a time step before update and "t+Δt" as a parameter that identifies a variable at a time step after update.

FIG. 1 is a diagram illustrating a bifurcation phenomenon of the first variables $x_i$ obtained when an optimization problem is solved by the basic simulated bifurcation algorithm. When an optimization problem is solved by the basic simulated bifurcation algorithm, a bifurcation phenomenon occurs, that is, a system with a single stable motion state changes to a system with two stable motion states as the parameters in the system change. As illustrated in FIG. 1, as the bifurcation phenomenon proceeds, the first variables $x_i$ are concentrated on the vicinity of −1 or +1.

Here, in a dynamical system, the change in position and momentum of a plurality of oscillators by the passage of time is called time evolution. The simulation of such time evolution with computational resources is called time evolution simulation. A dynamical system in which N oscillators interact with each other is called an N-body oscillator system. The simulated bifurcation algorithm achieves the search for ground states of the Ising spin model corresponding to the combinatorial optimization problem by the time evolution simulation of the N-body oscillator system. The simulated bifurcation algorithm updates N first variables $x_i$ and N second variables $y_i$ sequentially for each time step from the initial time to the end time and alternately between the first variables $x_i$ and the second variables $y_i$. In this way, the simulated bifurcation algorithm can perform the time evolution simulation of the N-body oscillator system.

The simulated bifurcation algorithm performs an interaction operation to calculate the interaction between oscillators and a time evolution operation to calculate the time evolution of oscillators. The simulated bifurcation algorithm performs the interaction operation and the time evolution operation at each time step from the initial time to the end time.

The interaction operation is an operation to calculate N $b_i$ in Equation (4). $b_i$ is called an intermediate variable. In the interaction operation, the input values necessary for calculating the ith intermediate variable $b_i$ are N first variables $x_i$ calculated at the previous time step.

The time evolution operation is an operation to calculate $x_i(t+\Delta t)$ and $y_i(t+\Delta t)$ in Equation (5). In the time evolution operation, the input values necessary for calculating the ith first variable $x_i(t+\Delta t)$ and the ith second variable $y_i(t+\Delta t)$ are the ith intermediate variable $b_i$ calculated by the time evolution operation, the ith $x_i(t)$ calculated at the previous time step, and the ith $y_i(t)$ calculated at the previous time step.

The simulated bifurcation algorithm may perform a portion of the time evolution operation before the interaction operation. For example, in the simulated bifurcation algorithm, each of N first variables $x_i$ may be multiplied in advance by a coefficient multiplied by the time evolution operation, prior to the interaction operation. For example, the simulated bifurcation algorithm may perform the interaction operation after multiplying each of N first variables $x_i$ by constants $-c$ and $\Delta t$ in advance. The variable $x_i$ multiplied by $-c\times\Delta t$ may be denoted as $x'_i$. Since $x'_j$ is a variable obtained by multiplying $x_i$ by a coefficient, $x'_i$ is not different from $x_i$ in that it is a variable representing the position of the corresponding oscillator.

The 0-1 combinatorial optimization problem can be solved fast not only using the basic simulated bifurcation algorithm as described above but also using an improved simulated bifurcation algorithm of the basic simulated bifurcation algorithm. For example, the simulated bifurcation algorithm may be an algorithm in which the updating order of the first variables $x_i$ and the second variables $y_i$ at each time step is interchanged.

The simulated bifurcation algorithm may perform a momentum update process and a position update process alternately a predetermined number of times in the time evolution operation for a single time step. The momentum update process is a process of calculating the difference of momentum $\delta y_i$ after a minute time shorter than the time step by the FX function using the first variable $x_i$ representing the position as an input, and updating the second variable $y_i$ with the calculated difference of momentum $\delta y_i$. The position update process is a process of calculating the difference of position $\delta x_i$ after a minute time by the FY function using the second variable $y_i$ representing the momentum as an input, and updating the first variable $x_i$ with the calculated difference of position $\delta x_i$.

The simulated bifurcation algorithm may also perform the computation by setting K in Equation (5) to 0 and limiting the range of both or one of the first variable $x_i$ and the second variable $y_i$ to within a predetermined range (for example, −1 through +1, both inclusive). The simulated bifurcation algorithm may also binarize the value of the first variable $x_i$ by the signum function $\mathrm{sgn}(x_i)$ in the computation at each time step. The simulated bifurcation algorithm may also perform a predetermined manipulation (for example, manipulations such as adding a predetermined value, multiplying a predetermined value, adding a random number, or multiplying a random number) on one or both of the first variable $x_i$ and the second variable $y_i$ under a predetermined condition, in the computation at each time step. In other words, the simulated bifurcation algorithm may be any algorithm that adds the effect of the bifurcation phenomenon to the first variables $x_i$ with time evolution and updates N first variables $x_i$ and N second variables $y_i$ sequentially for each time step from the initial time to the end time and alternately between the first variables $x_i$ and the second variables $y_i$.

Functional Block Configuration

Figure 2:
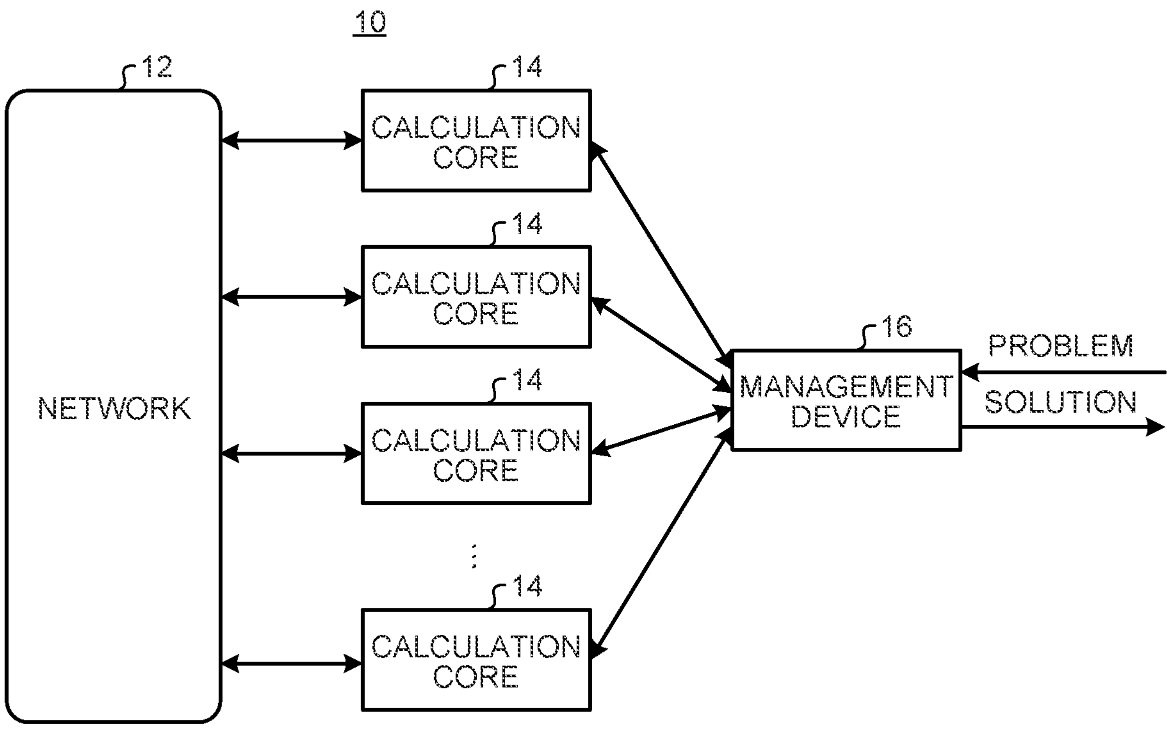
FIG. 2 is a diagram illustrating a configuration of a calculation device according to the present embodiment.

FIG. 2 is a diagram illustrating a configuration of a calculation device 10 according to the present embodiment.

The calculation device 10 outputs the solution of the optimization problem with N discrete variables, using the simulated bifurcation algorithm.

The calculation device 10 includes a network 12, P calculation cores 14, and a management device 16. P is an integer equal to or greater than 2. In other words, the calculation device 10 includes a plurality of calculation cores 14.

The network 12 connects P calculation cores 14 to allow them to transmit and receive information. Each of P calculation cores 14 is a hardware computational resource. Each of P calculation cores 14 is implemented, for example, by a circuit implemented in a semiconductor device. Each of P calculation cores 14 is connected to the network 12.

The management device 16 is connected to each of P calculation cores 14. The management device 16 acquires information representing the optimization problem from an external device. The management device 16 sets initial information in each of P calculation cores 14, based on information representing the acquired problem. Then, the management device 16 allows P calculation cores 14 to calculate the simulated bifurcation algorithm in parallel to calculate the solution of the optimization problem.

In response to instructions from the management device 16, P calculation cores 14 calculate N first variables $x_i$ representing the position in N oscillators and N second variables $y_i$ representing the momentum, sequentially for each time step from the initial time to the end time, using the simulated bifurcation algorithm. P calculation cores 14 output the values based on N first variables $x_i$ at the end time as calculation results. The management device 16 then acquires the calculation result from each of P calculation cores 14 and outputs the solution of the optimization problem based on the calculation result to an external device.

Figure 3:
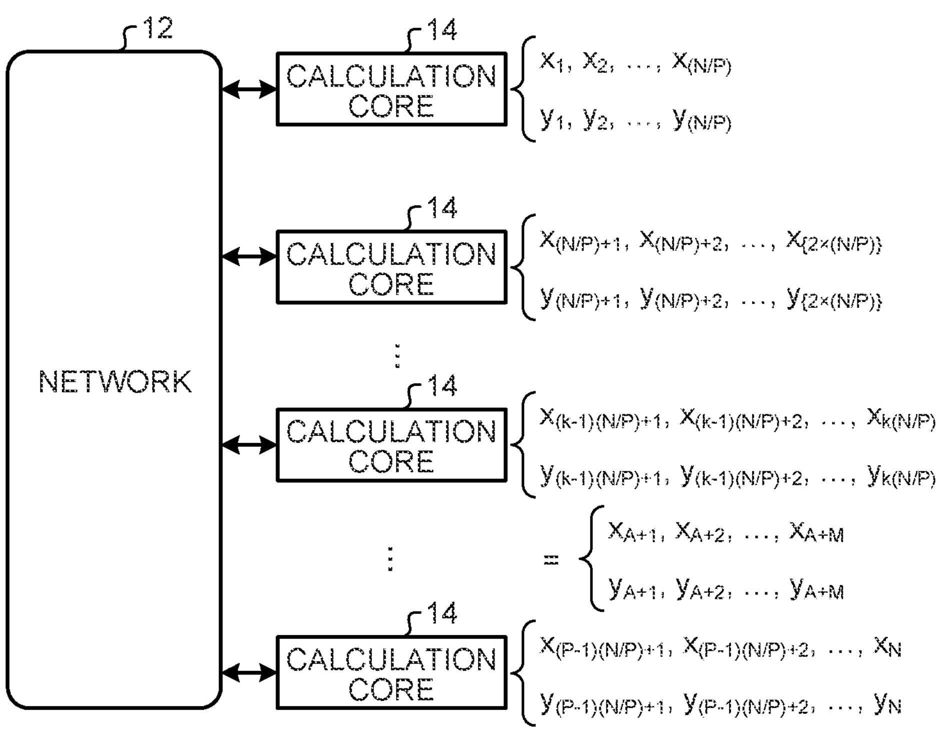
FIG. 3 is a diagram illustrating assignment of first variables and second variables.

FIG. 3 is a diagram illustrating assignment of the first variables $x_i$ and the second variables $y_i$ to each of P calculation cores 14.

Each of P calculation cores 14 is exclusively assigned with some of N oscillators. That is, each of N oscillators is assigned to any one of P calculation cores 14 and is not assigned to two or more calculation cores 14. Each of P calculation cores 14 then calculates the first variables $x_i$ and the second variables $y_i$ corresponding to one or more oscillators assigned thereto.

For example, in the case illustrated in FIG. 3, each of P calculation cores 14 is exclusively assigned (N/P) oscillators. In this case, P is a divisor of N. The first calculation core 14 then calculates $x_1$ to $x_{(N/P)}$ and $y_1$ to $y_{(N/P)}$. The second calculation core 14 calculates $x_{(N/P)+1}$ to $x_{2\times(N/P)}$ and $y_{(N/P)+1}$ to $y_{2\times(N/P)}$. The Pth calculation core 14 calculates $x_{(P-1)(N/P)+1}$ to $x_N$ and $y_{(P-1)(N/P)+1}$ to $y_N$.

Each of P calculation cores 14 is not necessarily assigned the same number of oscillators. That is, each of P calculation cores 14 may be assigned a different number of oscillators.

In this embodiment, the kth (k is an integer of 1 through P, both inclusive) calculation core 14-*k* is assigned with M (M is an integer equal to or greater than 1 and less than N) oscillators. When the same number of oscillators are not assigned to each of P calculation cores 14, M is a value that varies among calculation cores 14. Then, in the present embodiment, at each time step, the kth calculation core 14 calculates M first variables $x_{A+1}$ to $x_{A+M}$ and M second variables $y_{A+1}$ to $y_{A+M}$ corresponding to the assigned M oscillators. A is any integer equal to or greater than 0 and less than (N−M).

Each of P calculation cores 14 acquires N first variables $x_i$ at the previous time step by the interaction operation in order to calculate the intermediate variable $b_i$ corresponding to the assigned oscillator. Thus, at each time step, each of P calculation cores 14 transmits the calculated M first variables $x_i$ to the other calculation cores 14 via the network 12.

In addition, at each time step, each of P calculation cores 14 receives a plurality of first variables $x_i$ calculated by (P−1) calculation cores 14 excluding the corresponding calculation core itself via the network 12. Each of P calculation cores 14 may receive M first variables $x_i$ calculated by the calculation core 14 itself from the network 12 or may acquire them through a shortcut path formed inside the calculation core 14 itself without via the network 12.

Figure 4:
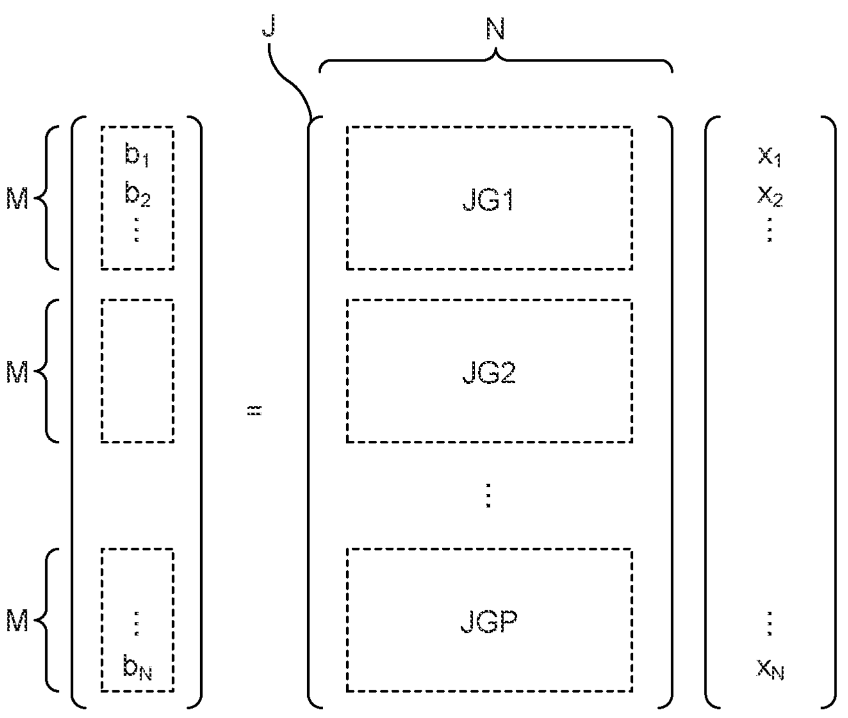
FIG. 4 is a diagram illustrating a coupling matrix to be set in P calculation cores.

FIG. 4 is a diagram illustrating a coupling matrix J to be set in P calculation cores 14.

Some of N×N coupling coefficients $J_{i,j}$ that are used for calculating the intermediate variables $b_i$ corresponding to the assigned oscillators are set for each of P calculation cores 14. In addition, some of N bias coefficients $h_1$ that are used for calculating the intermediate variables $b_1$ corresponding to the assigned oscillators are set for each of P calculation cores 14.

For example, suppose that each of P calculation cores 14 is exclusively assigned (N/P=M) oscillators. In this case, in each of P calculation cores 14, an N−M submatrix containing N×M coupling coefficients $J_{i,j}$ of the coupling matrix J is set.

For example, in the first calculation core 14, an (N/P) row by N column submatrix JG1 from the first row to the (N/P)th row of the coupling matrix J is set. In the second calculation core 14, a submatrix JG2 from the {(N/P)+1}th row to the {2×(N/P)}th row of the coupling matrix J is set. In the Nth calculation core 14, a submatrix JGP from the {(P−1)(N/P)+1}th row to the Nth row of the coupling matrix J is set.

FIG. 4 illustrates an example in which all N bias coefficients $h_i$ are zero and each of P calculation cores 14 does not perform any computation on the bias coefficients $h_i$.

Figure 5:
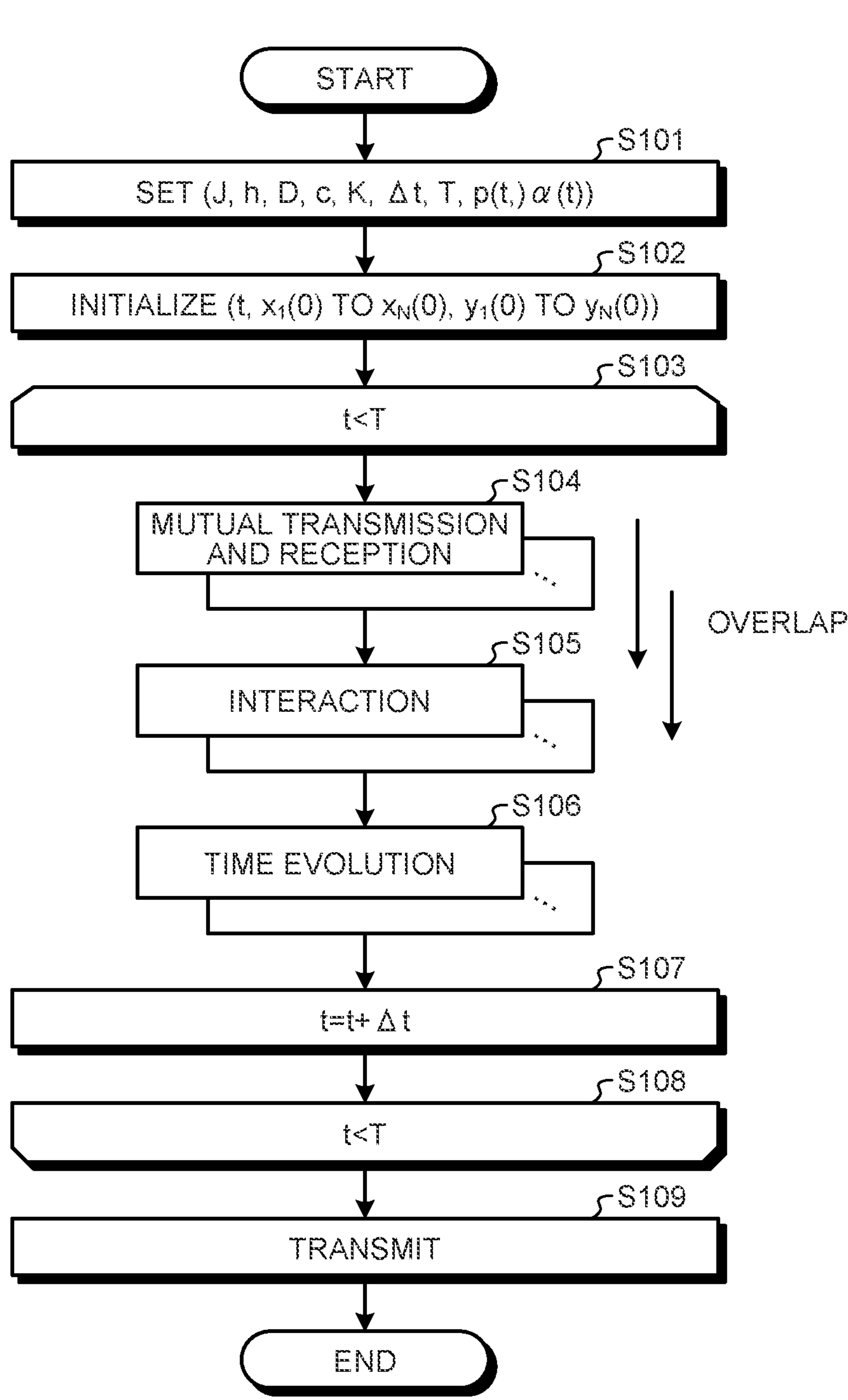
FIG. 5 is a flowchart illustrating a process in the calculation device.

FIG. 5 is a flowchart illustrating a process in the calculation device 10. The calculation device 10 performs a process, for example, according to the flow illustrated in FIG. 5.

First, at S101, the management device 16 sets the parameters for solving the 0-1 combinatorial optimization problem in P calculation cores 14. Specifically, the management device 16 sets the coupling matrix J and the bias array h in P calculation cores 14. In this case, the management device 16 sets, for each of P calculation cores 14, a submatrix used for calculating the intermediate variables $b_i$ corresponding to the assigned oscillators in the coupling matrix J. Similarly, the management device 16 sets, for each of the P calculation cores 14, a subarray used for calculating the intermediate variables $b_i$ corresponding to the assigned oscillators in the bias array h.

In addition, the management device 16 sets D, c, K, Δt representing the time step, T representing the end time, a function p(t), and a function α(t) in each of P calculation cores 14. p(t) and α(t) are increasing functions taking 0 at t=initial time (for example, 0) and 1 at t=end time (T). The calculation device 10 may set D, c, K, Δt, T, p(t), and α(t) in accordance with values received from an external device or may set values determined in advance and unable to be changed.

Subsequently, at S102, the management device 16 initializes the variables set in each of P calculation cores 14. Specifically, the management device 16 initializes t that is a variable representing the time step to the initial time (for example, 0). Furthermore, the management device 16 initializes each of N first variables ($x_1(t)$ to $x_N(t)$) and N second variables ($y_1(t)$ to $y_N(t)$) to an initial value received from an external device, a predetermined fixed value, or a random number. Each of N first variables ($x_1(t)$ to $x_N(t)$) and each of N second variables ($y_1(t)$ to $y_N(t)$) are set in the calculation core 14 to which the variables are assigned among P calculation cores 14.

Subsequently, P calculation cores 14 repeat the loop process between S103 and S108 until t becomes equal to or greater than T. In one loop process, P calculation cores 14 calculate N first variables ($x_1(t+\Delta t)$ to $x_N(t+\Delta t)$) at a target time (t+Δt), based on N first variables ($x_1(t)$ to $x_N(t)$) at the previous time (t) and N second variables ($y_1(t+\Delta t)$ to $y_N(t+\Delta t)$) at the target time (t+Δt). In one loop process, P calculation cores 14 calculate N second variables ($y_1(t+\Delta t)$ to $y_N(t+\Delta t)$) at a target time (t+Δt), based on N first variables ($x_1(t)$ to $x_N(t)$) at the previous time (t) and N second variables ($y_1(t)$ to $y_N(t)$) at the previous time (t).

The previous time (t) is the time a time step (Δt) before the target time (t+Δt). P calculation cores 14 therefore can update N first variables ($x_1(t)$ to $x_N(t)$) and N second variables ($y_1(t)$ to $y_N(t)$) sequentially for each unit time (Δt) from the initial time (t=0) to the end time (t=T) by repeating the loop process between S103 and S108.

In the loop, P calculation cores 14 perform the process at S104 to S107.

At S104, P calculation cores 14 mutually transmit and receive N first variables ($x_1(t)$ to $x_N(t)$) at the previous time (t) via the network 12. That is, each of P calculation cores 14 transmits the first variable $x_i$ at the previous time (t) corresponding to the assigned oscillator that is calculated by the calculation core 14 itself to the other calculation cores 14 via the network 12. Each of P calculation cores 14 then receives the first variables $x_i$ at the previous time (t) that are calculated by the other (P−1) calculation cores 14, via the network 12. Each of P calculation cores 14 may receive the first variable $x_i$ at the previous time (t) corresponding to the assigned oscillator that is calculated by the calculation core 14 itself, via the network 12, or may acquire the same via a shortcut path formed inside the calculation core 14 itself without via the network 12.

Here, each of P calculation cores 14 receives N first variables ($x_1(t)$ to $x_N(t)$) portion by portion sequentially.

For example, suppose that the communication period for transmitting and receiving N first variables ($x_1(t)$ to $x_N(t)$) is time-divided into P time slots. In this case, each of P calculation cores 14 is exclusively assigned to any one of P time slots. Each of the calculation cores 14 then broadcasts the first variables $x_i$ calculated by the calculation core 14 itself via the network 12 in the time slot assigned to the calculation core 14 itself. In this case, each of P calculation cores 14 receives a predetermined number of transmitted first variables $x_i$ in each of P time slots. Each of P calculation cores 14 thus can receive N first variables ($x_1(t)$ to $x_N(t)$) portion by portion sequentially.

For example, suppose that the network 12 connects P calculation cores 14 in a ring form. In this case, P calculation cores 14 transfer the first variables $x_i$ in a bucket-brigade fashion such that the first variables $x_i$ circulate through the ring. For example, each of P calculation cores 14 receives and buffers the first variable $x_i(t)$ transmitted from the directly connected first calculation core 14 and transmits the first variable $x_i(t)$ buffered in the calculation core 14 itself to the directly connected second calculation core 14 other than the first calculation core 14. Then, each of P calculation cores 14 repeats such receiving process and transmitting process until all N first variables $x_i$ are received. In other words, each of N first variables $x_i(t)$ goes around the ring once. Each of P calculation cores 14 thus can receive N first variables ($x_1(t)$ to $x_N(t)$) portion by portion sequentially.

Subsequently, at S105, P calculation cores 14 perform the interaction operation. More specifically, each of P calculation cores 14 performs the interaction operation to calculate the intermediate variable $b_i$ corresponding to the assigned oscillator. P calculation cores 14 thus can perform the interaction operation in parallel.

The interaction operation includes a matrix multiplication process and a bias addition process. The matrix multiplication process for the intermediate variable $b_i$ is the process of performing a product-sum operation of N first variables ($x_1(t)$ to $x_N(t)$) and N coupling coefficients $J_{i,1}$ to $J_{i,N}$ contained in the row corresponding to the intermediate variable $b_i$ in the coupling matrix J. The bias addition process for the intermediate variable $b_i$ is the process of adding the bias coefficient $h_i$ corresponding to the intermediate variable $b_i$ to the result of the matrix multiplication. When the bias coefficient $h_i$ is 0, the interaction operation does not include the bias addition process and includes only the matrix multiplication process.

Here, each of P calculation cores 14 performs the interaction operation portion by portion sequentially. That is, each of P calculation cores 14 repeats the product-sum operation for each some of N first variables ($x_1(t)$ to $x_N(t)$) and, at each iteration, cumulatively adds the product-sum operation result to the intermediate variable $b_i$.

Furthermore, each of P calculation cores 14 performs sequential interaction operations so as to overlap the process of the mutual transmitting and receiving process at S104. That is, each of P calculation cores 14 starts calculating the intermediate variable $b_i$ before the reception of all of the first variables $x_i$ calculated by the other (P−1) calculation cores 14 is completed.

For example, every time some of N first variables ($x_1(t)$ to $x_N(t)$) are received, each of P calculation cores 14 buffers the received some of first variables $x_i(t)$. Subsequently, each of P calculation cores 14 performs a partial interaction operation on the buffered some of first variables $x_i(t)$ and stores the result of the partial interaction operation in the corresponding intermediate variable $b_i$. Subsequently, each of P calculation cores 14 newly receives and buffers the next some of first variables $x_i(t)$. Subsequently, each of P calculation cores 14 performs a partial interaction operation on the newly received first variables $x_i(t)$ and cumulatively adds the result of the partial interaction operation in the intermediate variable $b_i$. Each of P calculation cores 14 repeats the above process for all of N first variables ($x_1(t)$ to $x_N(t)$). Each of P calculation cores 14 thus can perform the interaction operation so as to overlap the mutual transmitting and receiving process at S104.

Subsequently, after the process at S105 is completed, at S106, P calculation cores 14 perform the time evolution operation. More specifically, each of P calculation cores 14 performs the time evolution operation using the intermediate variable $b_i$, the first variable $x_i(t)$ at the previous time, and the second variable $y_i(t)$ at the previous time corresponding to the assigned oscillator and calculates the first variable $x_i(t+\Delta t)$ at the target time and the second variable $y_i(t+\Delta t)$ at the target time.

Subsequently, at S107, P calculation cores 14 update each of the previous time (t) and the target time (t+Δt) by adding the time step (Δt) to the previous time (t).

Subsequently, at S108, P calculation cores 14 repeat the process from S104 to S107 until t reaches the end time (T). Then, when t reaches the end time (T), P calculation cores 14 exit the loop process between S103 and S108.

Subsequently, at S109, each of P calculation cores 14 transmits, to the management device 16, the first variable ($x_i(T)$) at the end time (t=T) corresponding to the oscillator assigned to the calculation core 14 itself. The management device 16 calculates, for each of N oscillators received from P calculation cores 14, the value of the corresponding spin in accordance with the sign of the first variable ($x_i(T)$) at the end time (t=T). For example, when the first variable ($x_i(T)$) at the end time (t=T) has a negative sign, the management device 16 sets the corresponding spin to −1, and when positive, sets the corresponding spin to +1. Then, the management device 16 outputs the calculated values of a plurality of spins or values obtained by converting the calculated values of a plurality of spins into discrete variables, as the solution of the combinatorial optimization problem.

By performing the above process at S101 to S109, the calculation device 10 can perform the computation in accordance with the simulated bifurcation algorithm and calculate N first variables ($x_1(t)$ to $x_N(t)$) and N second variables ($y_1(t)$ to $y_N(t)$) at the end time (t=T).

Figure 6:
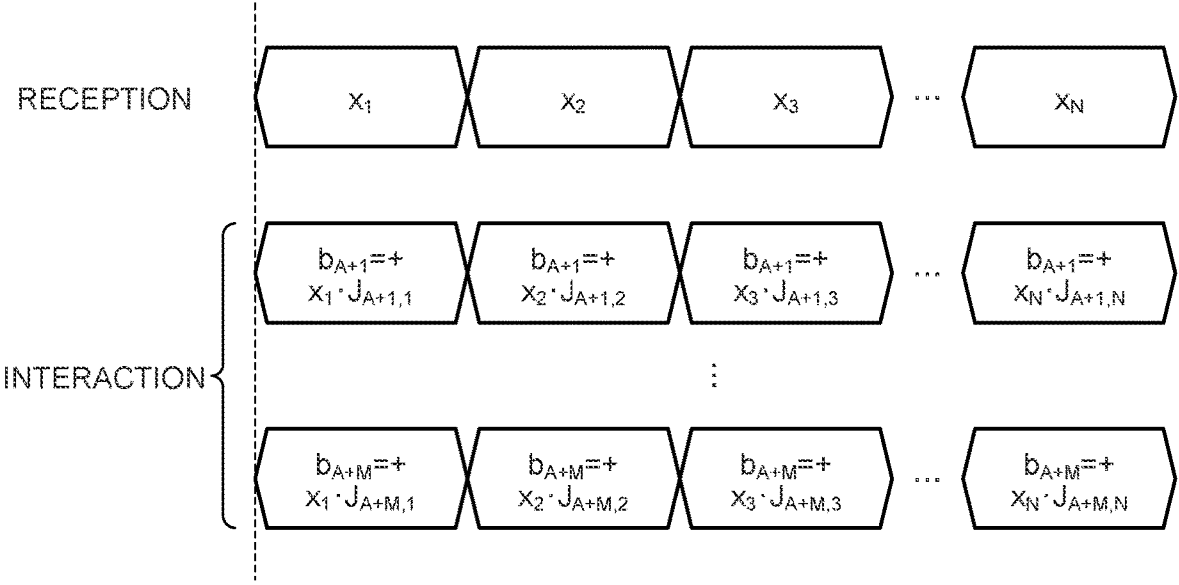
FIG. 6 is a diagram illustrating a first example of timings of reception and interaction operation.

FIG. 6 is a diagram illustrating a first example of timings of reception of and the interaction operation on the first variables $x_i$ by the kth calculation core 14-*k*.

When N first variables $x_i$ are transferred in a bucket-brigade fashion so as to cycle through the ring, there are some calculation cores 14 that start receiving not from the 1st first variable $x_i$. Thus, not all of P calculation cores 14 receive the first variables in order starting from the 1st first variables $x_i$. However, each of P calculation cores 14 stores the arrangement in the matrix of N×N coupling coefficients $J_{i,j}$ contained in the coupling matrix J such that they are sorted to correspond to the order in which N first variables $x_i$ are received. Thus, even when reception does not start from the 1st first variable $x_1$, each of P calculation cores 14 can perform the process in the same manner as when reception starts from the 1st first variable $x_1$. In a detailed description, the calculation cores 14 that start receiving not from the 1st first variable $x_i$ will be described in the same manner as the calculation core 14 that starts receiving from the 1st first variable $x_i$.

For example, the kth calculation core 14-*k* is assigned with M oscillators from the (A+1)th to (A+M)th oscillators among N oscillators. In this case, the kth calculation core 14-*k* calculates M intermediate variables $b_{A+1}$ to $b_{A+M}$ by the interaction operation.

For example, each of P calculation cores 14 sequentially receives N first variables $x_i$ one by one in predetermined cycles. Then, each of P calculation cores 14 temporarily buffers the received first variable $x_i$.

In this case, the kth calculation core 14-*k* calculates a multiplication value by multiplying the 1st first variable $x_1$ by the coupling coefficient $J_{A+1,1}$ in a period in which the 1st first variable $x_1$ is buffered. The coupling coefficient $J_{A+1,1}$ is the coefficient that corresponds to the (A+1)th intermediate variable $b_{A+i}$ and the 1st first variable $x_1$. The kth calculation core 14-*k* then adds the multiplication value to the intermediate variable $b_{A+i}$.

The kth calculation core 14-*k* performs the process similarly for each of the cycles in which the second and subsequent first variables $x_i$ are buffered. The kth calculation core 14-*k* then outputs M intermediate variables $b_{A+1}$ to $b_{A+M}$ after completing the process for the Nth first variable $x_N$. Each of M intermediate variables $b_{A+1}$ to $b_{A+M}$ is initialized to 0 before the interaction operation.

By performing the process as described above, the kth calculation core 14-*k* can perform the receiving process of N first variables $x_1$ to $x_N$ and the interaction operation in an overlapping manner.

Figure 7:
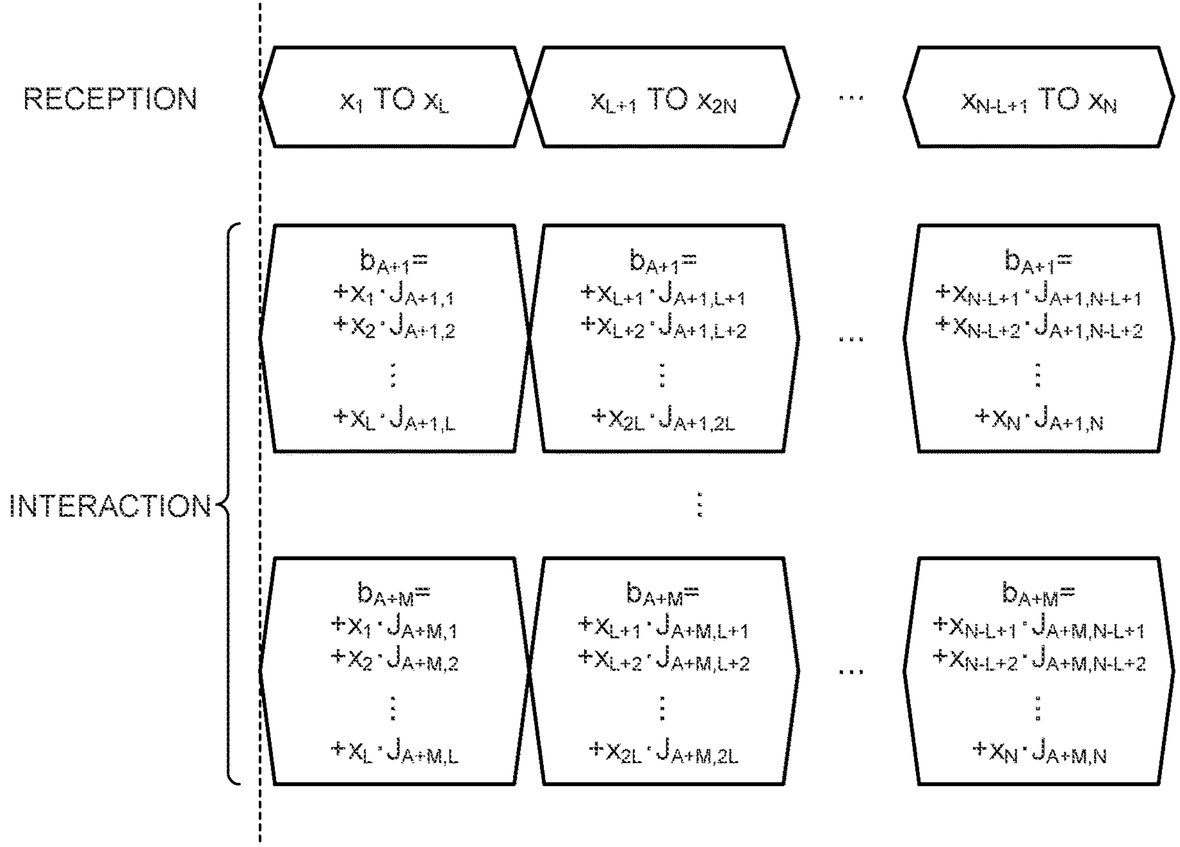
FIG. 7 is a diagram illustrating a second example of timings of reception and interaction operation.

FIG. 7 is a diagram illustrating a second example of timings of reception of and the interaction operation on the first variables $x_i$ by the kth calculation core 14-*k*.

For example, each of P calculation cores 14 may receive N first variables $x_i$ to $x_N$ L by L (L is equal to or greater than 1 and less than N) sequentially in predetermined cycles. Then, each of P calculation cores 14 temporarily buffers a set of the received L first variables $x_i$.

In this case, the kth calculation core 14-*k* calculates a multiplication value by multiplying the 1st first variable $x_1$ by the coupling coefficient $J_{A+1,1}$ in a period in which a first set including the 1st first variable $x_1$ to the Lth first variable $x_L$ is buffered. Furthermore, the kth calculation core 14-*k* calculates a multiplication value similarly for the 2nd first variable $x_2$ to the Lth first variable $x_L$ in a period in which the first set is buffered. The kth calculation core 14-*k* then adds the total sum of the calculated L multiplication values to the intermediate variable $b_{A+1}$.

The kth calculation core 14-*k* performs the process similarly for each of the cycles in which the second and subsequent sets are buffered. The kth calculation core 14-*k* then outputs M intermediate variables $b_{A+1}$ to $b_{A+M}$ after completing the process for the last set.

By performing the process as described above, the kth calculation core 14-*k* can also perform the receiving process of N first variables $x_1$ to $x_N$ and the interaction operation in an overlapping manner.

Figure 8:
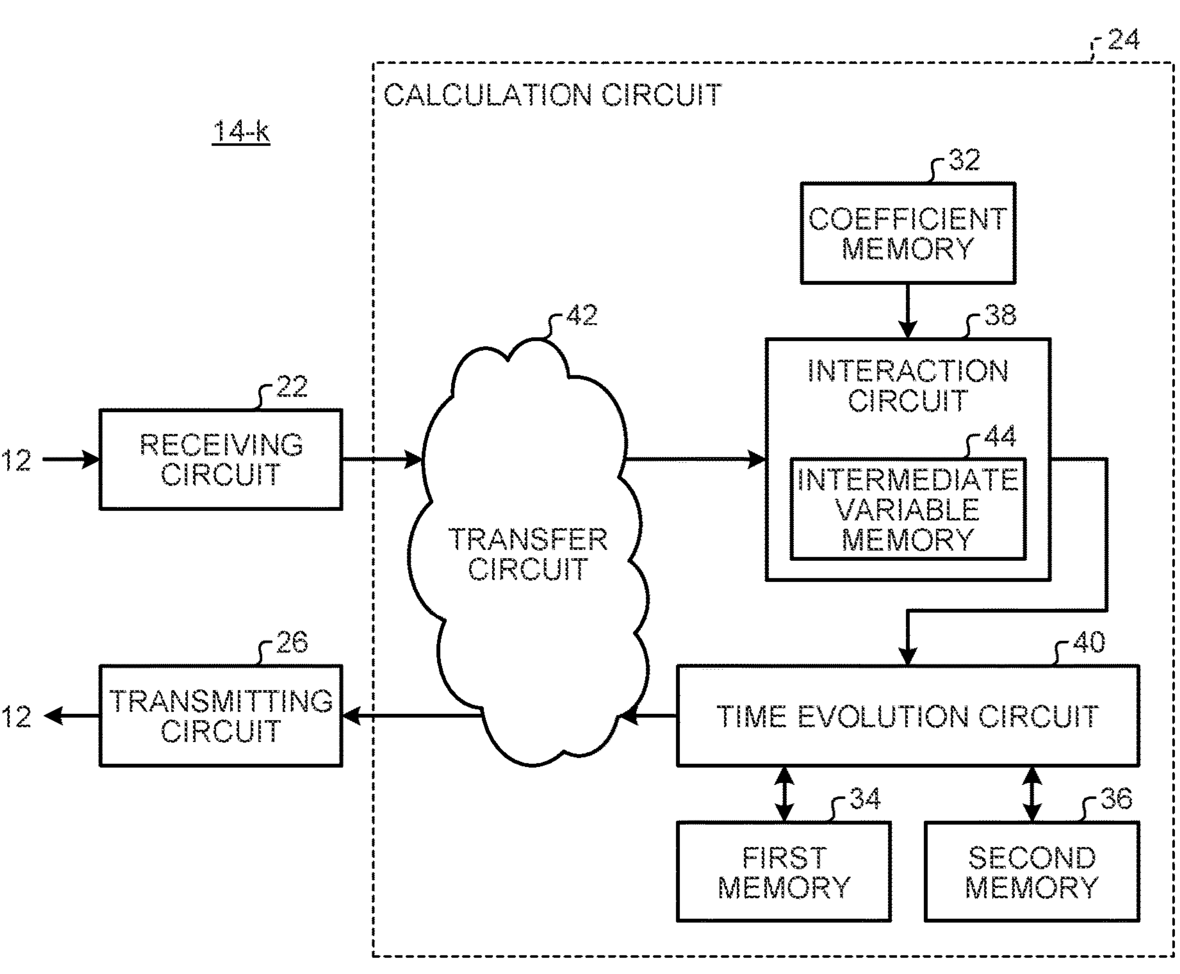
FIG. 8 is a diagram illustrating a configuration of the kth calculation core.

FIG. 8 is a diagram illustrating a configuration of the kth calculation core 14-*k*. The kth calculation core 14-*k* has a receiving circuit 22, a calculation circuit 24, and a transmitting circuit 26.

At each time step, the receiving circuit 22 receives (N−M) first variables $x_i$ at the previous time step that are calculated by (P−1) calculation cores 14 other than the kth calculation core 14-*k* among P calculation cores 14, portion by portion sequentially, via the network 12. At each time step, the receiving circuit 22 may receive all of N first variables $x_i$ including M first variables $x_i$ calculated by the kth calculation core 14-*k*, via the network 12.

At each time step, the calculation circuit 24 performs the interaction operation based on N first variables $x_i$ at the previous time step. The calculation circuit 24 thus can calculate M intermediate variables $b_i$ corresponding to M oscillators assigned to the kth calculation core 14-*k*. Furthermore, at each time step, the calculation circuit 24 performs the time evolution operation, based on M intermediate variables $b_i$ obtained by performing the interaction operation, and M first variables $x_i$ at the previous time step and M second variables $y_i$ at the previous step corresponding to M oscillators assigned to the kth calculation core 14-*k*. The calculation circuit 24 thus can calculate M first variables $x_i$ at the target time step and M second variables $y_i$ at the target time step corresponding to M oscillators assigned to the kth calculation core 14-*k*.

At each time step, the transmitting circuit 26 transmits M first variables $x_i$ calculated by the calculation circuit 24 to (P−1) calculation cores 14 other than the kth calculation core 14-*k* among P calculation cores 14, via the network 12. At each time step, the transmitting circuit 26 may transmit M first variables $x_i$ calculated by the calculation circuit 24 to P calculation cores 14 including the kth calculation core 14-*k* itself, via the network 12.

The calculation circuit 24 includes a coefficient memory 32, a first memory 34, a second memory 36, an interaction circuit 38, a time evolution circuit 40, and a transfer circuit 42.

The coefficient memory 32 stores an M×N submatrix containing MXN coupling coefficients $J_{i,j}$ that are used for calculating M intermediate variables $b_i$ corresponding to M oscillators assigned to the kth calculation core 14-*k*, among N×N coupling coefficients $J_{i,j}$ contained in the coupling matrix J. The coefficient memory 32 also stores M bias coefficients $h_1$ that are used for calculating M intermediate variables $b_i$ corresponding to M oscillators assigned to the kth calculation core 14-*k*, among N bias coefficients $h_i$ contained in the bias array h. The M×N submatrix containing M×N coupling coefficients $J_{i,j}$ and M bias coefficients $h_i$ stored in the coefficient memory 32 are preset by the management device 16.

The first memory 34 stores M first variables $x_i$ corresponding to M oscillators assigned to the kth calculation core 14-*k*. M first variables $x_i$ stored in the first memory 34 are updated by the time evolution circuit 40 at each time step. M first variables $x_i$ stored in the first memory 34 are set to predetermined fixed values or random numbers in the initial state.

The second memory 36 stores M second variables $y_i$ corresponding to M oscillators assigned to the kth calculation core 14-*k*. M second variables $y_i$ stored in the second memory 36 are updated by the time evolution circuit 40 at each time step. M second variables $y_i$ stored in the second memory 36 are set to predetermined fixed values or random numbers in the initial state.

At each time step, the interaction circuit 38 calculates M intermediate variables $b_i$ corresponding to M oscillators assigned to the kth calculation core 14-*k*, based on the M×N submatrix containing M×N coupling coefficients $J_{i,j}$ and M bias coefficients $h_i$ stored in the coefficient memory 32, and N first variables $x_i$ at the previous time step. More specifically, at each time step, the interaction circuit 38 calculates M intermediate variables $b_i$ corresponding to M oscillators assigned to the kth calculation core 14-*k*, based on M first variables $x_i$ at the previous time step calculated by the kth calculation core 14-*k* and (N−M) first variables $x_i$ at the previous time step calculated by (P−1) calculation cores 14 other than the kth calculation core 14-*k*.

Here, at each time step, the interaction circuit 38 acquires N first variables $x_i$ portion by portion sequentially. Then, at each time step, the interaction circuit 38 calculates M intermediate variables $b_i$ by performing the interaction operation on N first variables $x_i$ portion by portion sequentially.

The interaction circuit 38 also includes an intermediate variable memory 44. The intermediate variable memory 44 stores M intermediate variables $b_i$ under calculation while the interaction operation is performed on N first variables $x_i$ portion by portion sequentially.

Furthermore, at each time step, the interaction circuit 38 starts calculating M intermediate variables $b_i$ before the receiving circuit 22 completes reception of all of (N−M) first variables $x_i$ at the previous time step. The interaction circuit 38 thus can perform the interaction operation so as to overlap the receiving process of (N−M) first variables $x_i$ by the receiving circuit 22.

Then, at each time step, the interaction circuit 38 supplies M intermediate variables $b_i$ to the time evolution circuit 40 after the interaction operation is finished.

At each time step, the time evolution circuit 40 calculates M first variables $x_i$ and M second variables $y_i$ at the target time step, based on M first variables $x_i$ at the previous time step stored in the first memory 34, M second variables $y_i$ at the previous time step stored in the second memory 36, and M intermediate variables $b_i$ calculated by the interaction circuit 38. At each time step, the time evolution circuit 40 updates M first variables $x_i$ stored in the first memory 34 and M second variables $y_i$ stored in the second memory 36.

The time evolution circuit 40 may calculate M first variables $x_i$ and M second variables $y_i$ by parallel processing by multiple circuits. For example, the time evolution circuit 40 may calculate M first variables $x_i$ and M second variables $y_i$ in M parallel by M circuits.

At each time step, the transfer circuit 42 transfers (N−M) first variables $x_i$ at the previous time step that are calculated by (P−1) calculation cores 14 other than the kth calculation core 14-*k* among P calculation cores 14, from the receiving circuit 22 to the interaction circuit 38. When the receiving circuit 22 receives N first variables $x_i$ including M first variables $x_i$ calculated by the kth calculation core 14-*k*, all of N first variables $x_i$ are transferred from the receiving circuit 22 to the interaction circuit 38. When the receiving circuit 22 does not receive M first variables $x_i$ calculated by the kth calculation core 14-*k*, the transfer circuit 42 transfers M first variables $x_i$ calculated by the time evolution circuit 40 through a shortcut from the time evolution circuit 40 to the interaction circuit 38.

At each time step, the transfer circuit 42 also transfers M first variables $x_i$ calculated by the time evolution circuit 40, from the time evolution circuit 40 to the transmitting circuit 26.

Figure 9:
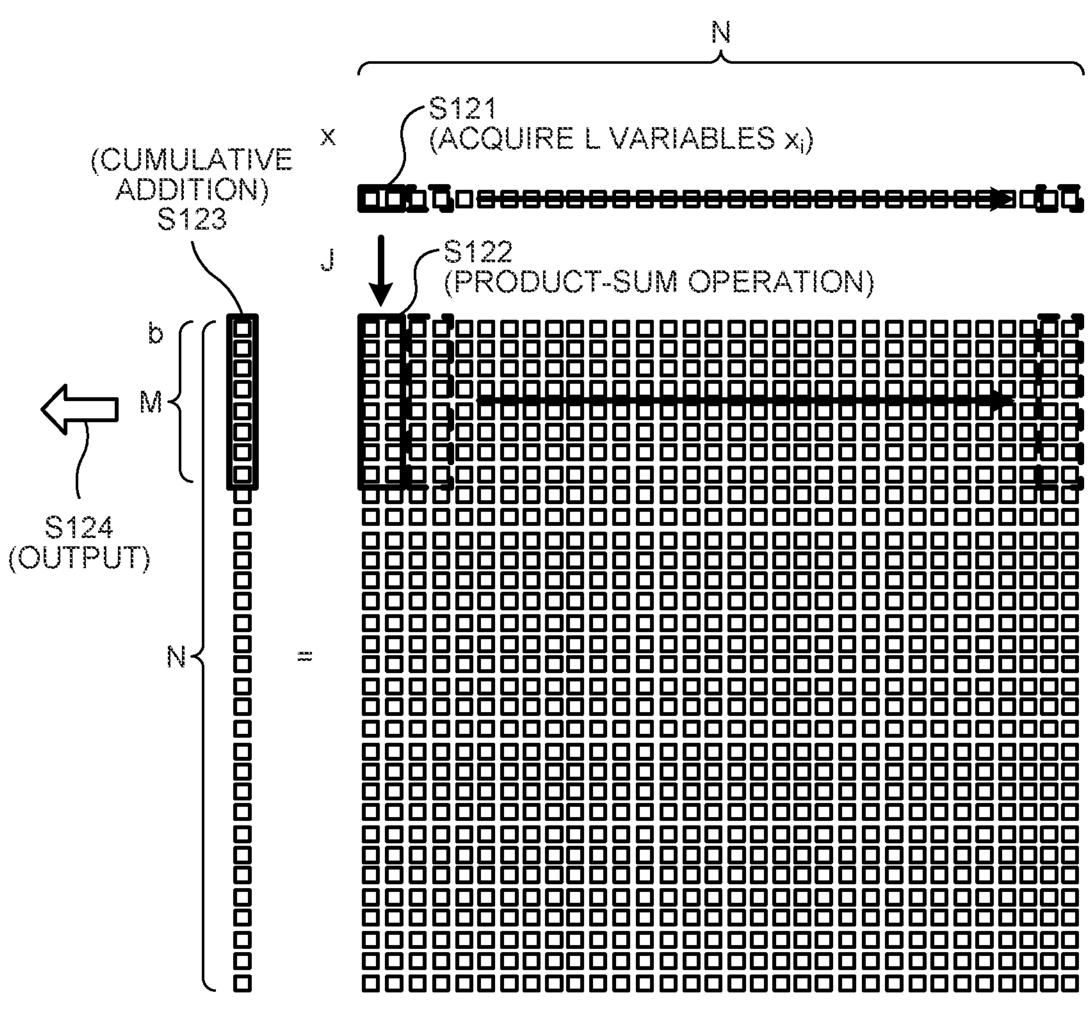
FIG. 9 is a diagram for explaining a sequential matrix multiplication process.

FIG. 9 is a diagram for explaining a sequential matrix multiplication process in the interaction circuit 38.

In the interaction operation, the interaction circuit 38 performs a matrix multiplication process of N first variables $x_i$ and the corresponding submatrix in the M row by N column coupling matrix J, sequentially, at each time step.

In the present embodiment, the interaction circuit 38 acquires N first variables $x_i$ at the previous time step, for each set of L first variables $x_i$ sequentially from the transfer circuit 42 (S121). L is an integer equal to or greater than 1 and less than N. For example, L is a divisor of N. For example, L may be N/P=M.

Every time L first variables $x_i$ are acquired, the interaction circuit 38 performs a product-sum operation of M×L coupling coefficients $J_{i,j}$ corresponding to the acquired L first variables $x_i$ in the M×N submatrix containing preset M×N coupling coefficients, and the acquired L first variables $x_i$, row by row (S122). Then, every time L first variables $x_i$ are acquired, the interaction circuit 38 cumulatively adds the computation result of the product-sum operation for each row to the corresponding intermediate variable $b_i$ among M intermediate variables $b_i$ stored in the intermediate variable memory 44 (S123). Then, at each time step, the interaction circuit 38 outputs M intermediate variables $b_i$ to the time evolution circuit 40 after completing the product-sum operation corresponding to the last L first variables $x_i$ among N first variables $x_i$ (S124). The interaction circuit 38 thus can calculate M intermediate variables $b_i$ by performing the interaction operation on N first variables $x_i$ portion by portion sequentially.

The time evolution circuit 40 acquires M intermediate variables $b_i$ output from the interaction circuit 38 and stores M intermediate variables $b_i$ in an internal buffer after the interaction operation is completed. The time evolution circuit 40 then performs the time evolution process, using M intermediate variables $b_i$ stored in the internal buffer. The buffer to store M intermediate variables $b_i$ after the interaction operation is completed may be provided in the interaction circuit 38 or may be provided in a path between the interaction circuit 38 and the time evolution circuit 40. Since the buffer to store M intermediate variables $b_i$ after the interaction operation is completed is provided in the calculation circuit 24, the interaction circuit 38 can start the interaction operation for calculating M intermediate variables $b_i$ at the next time step immediately after completing the interaction operation at the previous time step.

At each time step, the interaction circuit 38 erases M intermediate variables $b_i$ stored in the intermediate variable memory 44 before starting the computation using the initial L first variables $x_i$. That is, the interaction circuit 38 sets the values of M intermediate variables $b_i$ to 0 before starting the computation using the initial L first variables $x_i$. The interaction circuit 38 thus can store correct values in the intermediate variable memory 44.

Furthermore, at each time step, the interaction circuit 38 starts the computation using the initial L first variables $x_i$ among N first variables $x_i$ at the previous time step before the receiving circuit 22 completes reception of all of (N−M) first variables $x_i$ at the previous time step. The interaction circuit 38 thus can perform the interaction operation so as to overlap the receiving process of (N−M) first variables $x_i$ by the receiving circuit 22.

The calculation time for each of P calculation cores 14 as described above is determined by computational resources. The communication time for reception and transmission is determined by the communication throughput and the communication latency that is the amount of data transferred per unit time. When the calculation time and the communication time are constant, the total calculation time (time from inputting the initial first variable xi to completing the time evolution process) of each of P calculation cores 14 decreases as the time in which the calculation time and the communication time overlap increases.

In the present embodiment, the interaction circuit 38 starts the interaction operation before each of P calculation cores 14 completes reception of all of (N−M) first variables $x_i$ at the previous time step calculated by the other calculation cores 14. Each of P calculation cores 14 performs the receiving process and the interaction operation in an overlapping manner. Therefore, the calculation device 10 according to the present embodiment can prevent the total calculation time of each of P calculation cores 14 from being prolonged due to communication overhead. With this configuration, the calculation device 10 according to the present embodiment can solve a large-scale combinatorial optimization problem fast.

In particular, when the process time for the interaction operation is longer than the communication time, the calculation device 10 according to the present embodiment can completely eliminate the effect of the communication time on the total operating time of the calculation core 14.

Figure 10:
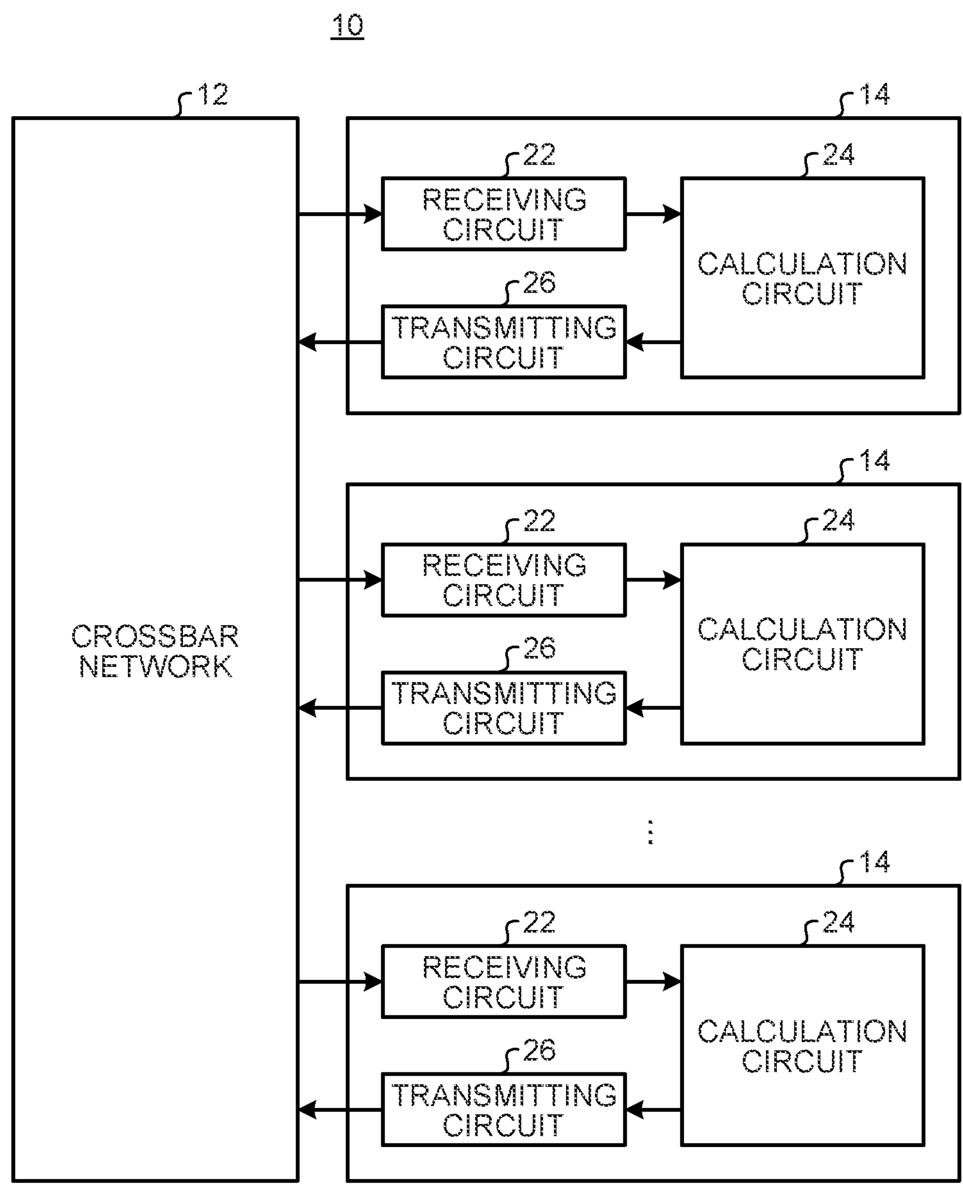
FIG. 10 is a diagram illustrating a first example of a network connecting P calculation cores.

FIG. 10 is a diagram illustrating a first example of the network 12 connecting P calculation cores 14. The network 12 may, for example, be a crossbar network. The network 12 may be a shared bus. With this configuration, each of P calculation cores 14 can broadcast the first variables $x_i$ to each of P calculation cores 14 via the network 12. That is, each of P calculation cores 14 can directly receive the first variables $x_i$ from each of P calculation cores 14 without through the other calculation cores 14.

The network 12 may include an Ethernet switch and an InfiniBand switch. The network 12 may have a router, a distribution device, or the like. In this case, the router or the distribution device can temporarily buffer the first variables $x_i$ transmitted from each of P calculation cores 14 and broadcast the buffered first variables $x_i$ to P calculation cores 14.

The network 12 is not limited to a crossbar network or a shared bus and may be any other type of network that can broadcast the first variables $x_i$ to each of P calculation cores 14. For example, the network 12 may be wiring that connects P calculation cores 14 to each other. In this case, the network 12 can significantly reduce the communication latency between the calculation cores 14.

Figure 11:
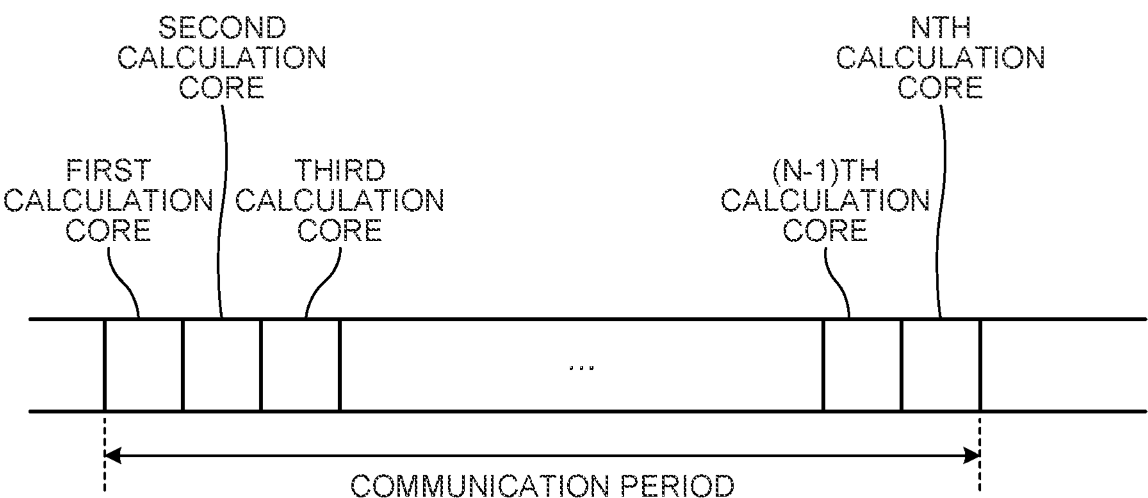
FIG. 11 is a diagram illustrating the transmission timing of the first variables for each of P calculation cores.

FIG. 11 is a diagram illustrating the transmission timing of the first variables $x_i$ of each of P calculation cores 14 connected via the network 12 in the first example.

When the network 12 is a crossbar network, a shared bus, or the like that enables each of P calculation cores 14 to broadcast, the communication period in which N first variables $x_i$ are transmitted and received is divided into a plurality of time slots. Each of P calculation cores 14 is exclusively assigned one of the time slots. The transmitting circuit 26 of each of P calculation cores 14 then broadcasts the calculated M first variables $x_i$ to each of P calculation cores 14 via the network 12 in the assigned time slot. In the assigned time slot, the transmitting circuit 26 may broadcast the calculated M first variables $x_i$ to (P−1) calculation cores 14 excluding the transmitting calculation core 14 itself among P calculation cores 14.

In this way, when the network 12 is a crossbar network or the like that enables each of P calculation cores 14 to broadcast, each of N first variables $x_i$ at each time step is assigned to one time slot among the time slots obtained by dividing the communication period and is transmitted via the network 12 in the assigned time slot. Each of P calculation cores 14 therefore can receive (N−M) first variables $x_i$ or N first variables $x_i$ portion by portion sequentially.

Figure 12:
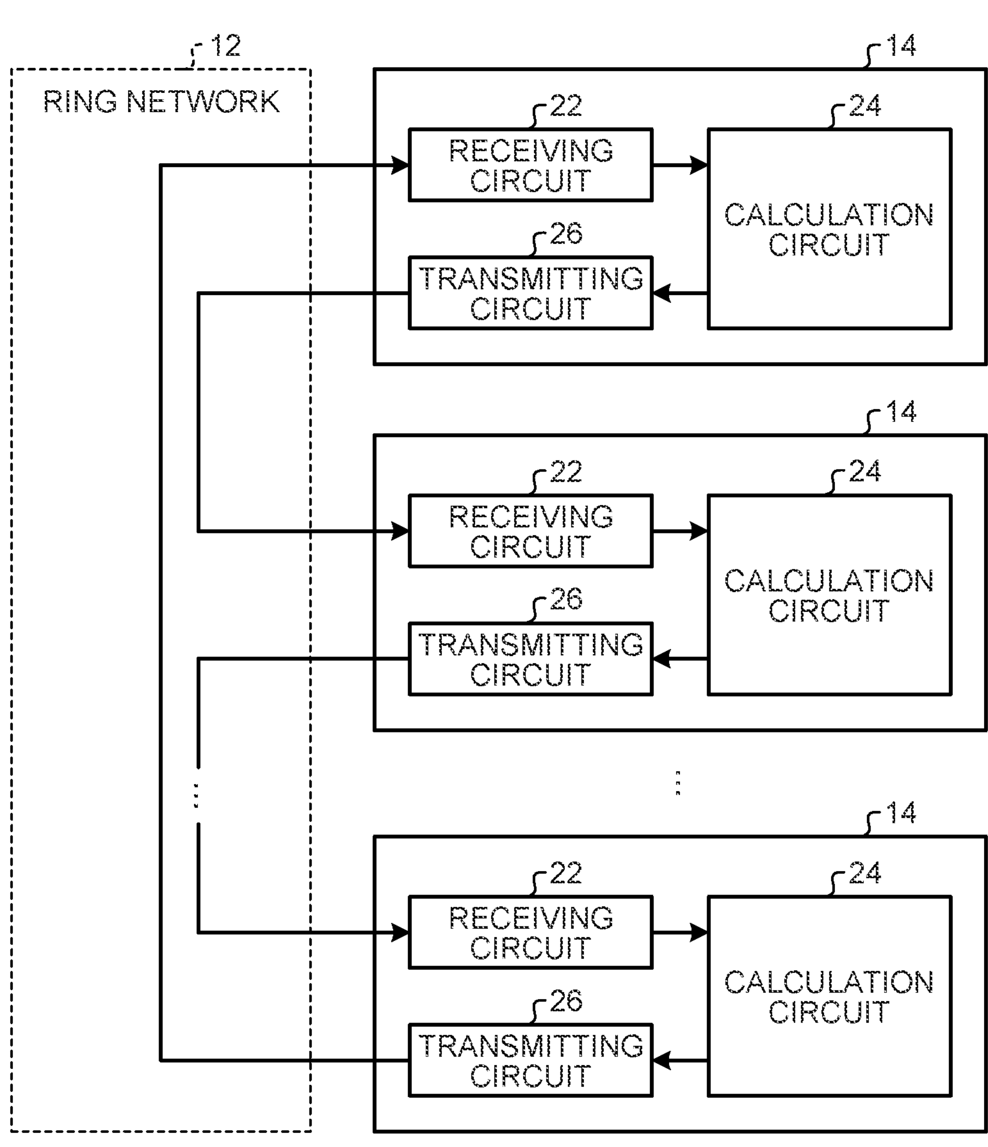
FIG. 12 is a diagram illustrating a second example of a network connecting P calculation cores.

FIG. 12 is a diagram illustrating a second example of the network 12 connecting P calculation cores 14. The network 12 may be a ring network that connects P calculation cores 14 in a ring form. The network 12 thus can cyclically transfer the first variables $x_i$ calculated by each of P calculation cores 14 to all of P calculation cores 14.

When the network 12 is a ring network, P calculation cores 14 transmit and receive N first variables $x_i$ portion by portion in a bucket-brigade fashion, in the communication period in which N first variables $x_i$ at each time step are transmitted and received.

For example, when the network 12 is a ring network, the receiving circuit 22 of each of P calculation cores 14 receives (N−M) first variables $x_i$ excluding M first variables $x_i$ calculated by the calculation core 14 itself among N first variables $x_i$, portion by portion, from the adjacent first calculation core 14 among P calculation cores 14, in the communication period. The receiving circuit 22 of each of P calculation cores 14 may receive all of N first variables $x_i$ including M first variables $x_i$ calculated by the calculation core 14 itself, from the adjacent first calculation core 14, in the communication period.

Furthermore, when the network 12 is a ring network, the transmitting circuit 26 of each of P calculation cores 14 transmits M first variables $x_i$ calculated by the calculation core 14 itself to the adjacent second calculation core 14 different from the first calculation core 14 among P calculation cores 14, in the communication period. Furthermore, the transmitting circuit 26 of each of P calculation cores 14 transmits (N−M) first variables $x_i$ received from the first calculation core 14 to the second calculation core 14 in the communication period. The transmitting circuit 26 of each of P calculation cores 14 may transmit or may not necessarily transmit the first variables $x_i$ calculated by the second calculation core 14 to the second calculation core 14 when it receives the first variables $x_i$ calculated by the second calculation core 14, in the communication period.

Such a network 12 allows the first variables $x_i$ transmitted from each of P calculation cores 14 to make a round so that each of P calculation cores 14 can receive N first variables $x_i$. By transmitting in this way, each of P calculation cores 14 can receive (N−M) first variables $x_i$ or N first variables $x_i$ portion by portion sequentially.

Figure 13:
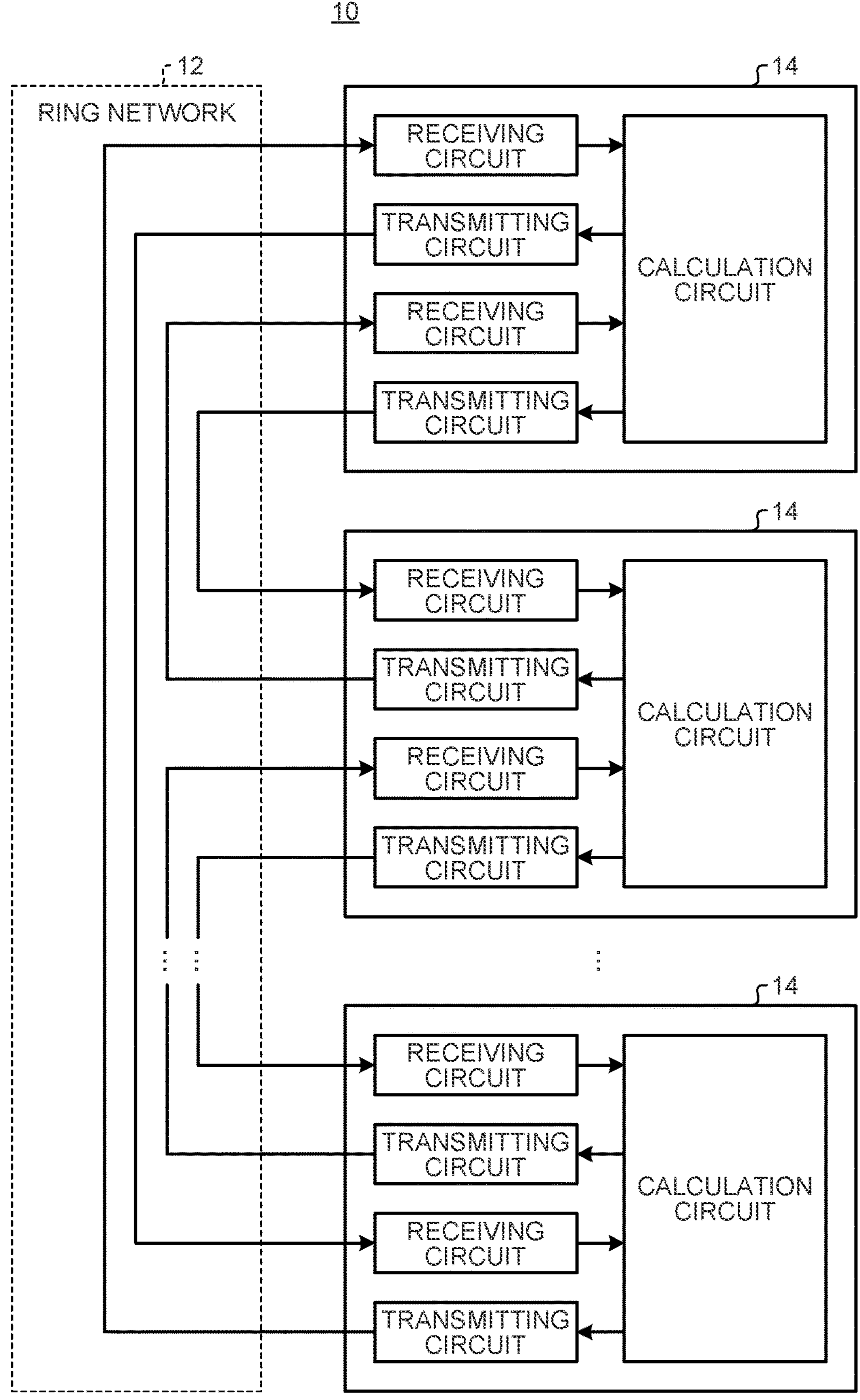
FIG. 13 is a diagram illustrating a third example of a network connecting P calculation cores.

FIG. 13 is a diagram illustrating a third example of the network 12 connecting P calculation cores 14. The network 12 may be a plurality of ring networks that connect P calculation cores 14 in a ring form.

For example, the network 12 may include a first ring network and a second ring network. In this case, each of P calculation cores 14 performs full-duplex communication.

The first ring network connects P calculation cores 14 along a ring-shaped first path and transfers data cyclically in a first direction of the first path. The second ring network connects P calculation cores 14 along the first path and transfers data cyclically in a second direction that is a direction opposite to the first direction of the first path.

The first ring network and the second ring network transfer the same first variables $x_i$. Alternatively, one of the first ring network and the second ring network may transfer a first variable group that is some of N first variables $x_i$, and the other may transfer a second variable group other than the first variable group of N first variables $x_i$.

P calculation cores 14, connected by such a network 12, can increase the communication throughput compared with the second example. P calculation cores 14 can shorten the period from start of transmission of N first variables $x_i$ to completion of transmission of all of N first variables $x_i$. When the first ring network and the second ring network transfer the same N first variables $x_i$, P calculation cores 14 can complete transfer of all of N first variables $x_i$ with a small number of hops.

Figure 14:
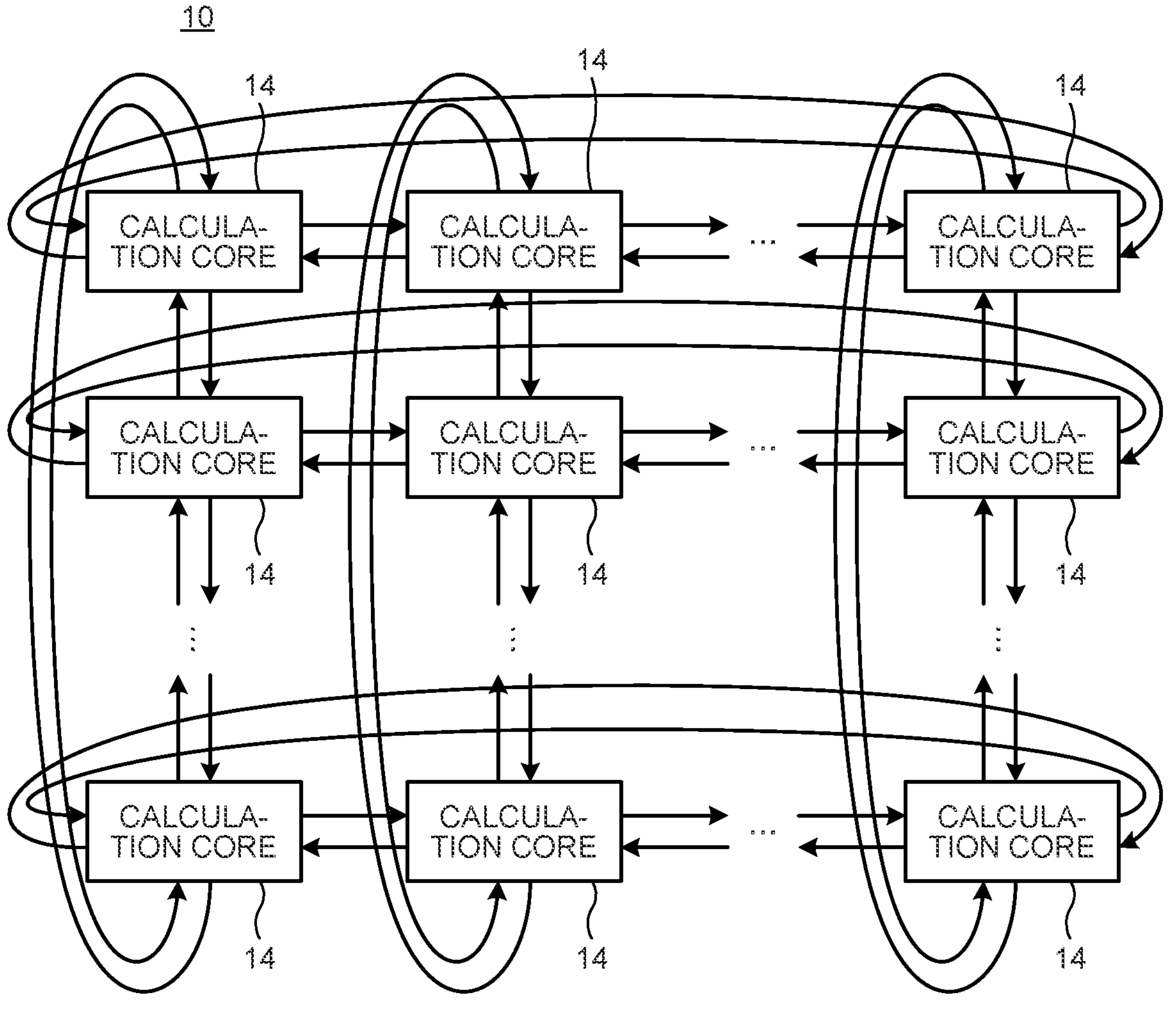
FIG. 14 is a diagram illustrating a fourth example of a network connecting P calculation cores.

FIG. 14 is a diagram illustrating a fourth example of the network 12 connecting P calculation cores 14. The network 12 may include three or more ring networks that connect P calculation cores 14 in a ring form. For example, as illustrated in FIG. 14, the network 12 may form connections by a plurality of ring networks in a two-dimensional torus shape.

In this case, P calculation cores 14 repeat the process of transmitting a predetermined number of first variables $x_i$ to the adjacent calculation core 14 in a vertical ring network and then transmitting a predetermined number of first variables $x_i$ cyclically in one turn of the ring in a horizontal ring network.

Each of P calculation cores 14, connected by such a network 12, can receive the first variables $x_i$ calculated by the other calculation cores 14 with a small number of hops. Therefore, P calculation cores 14, connected by such a network 12, can complete transfer of all of N first variables $x_i$ with a small number of hops.

Figure 15:
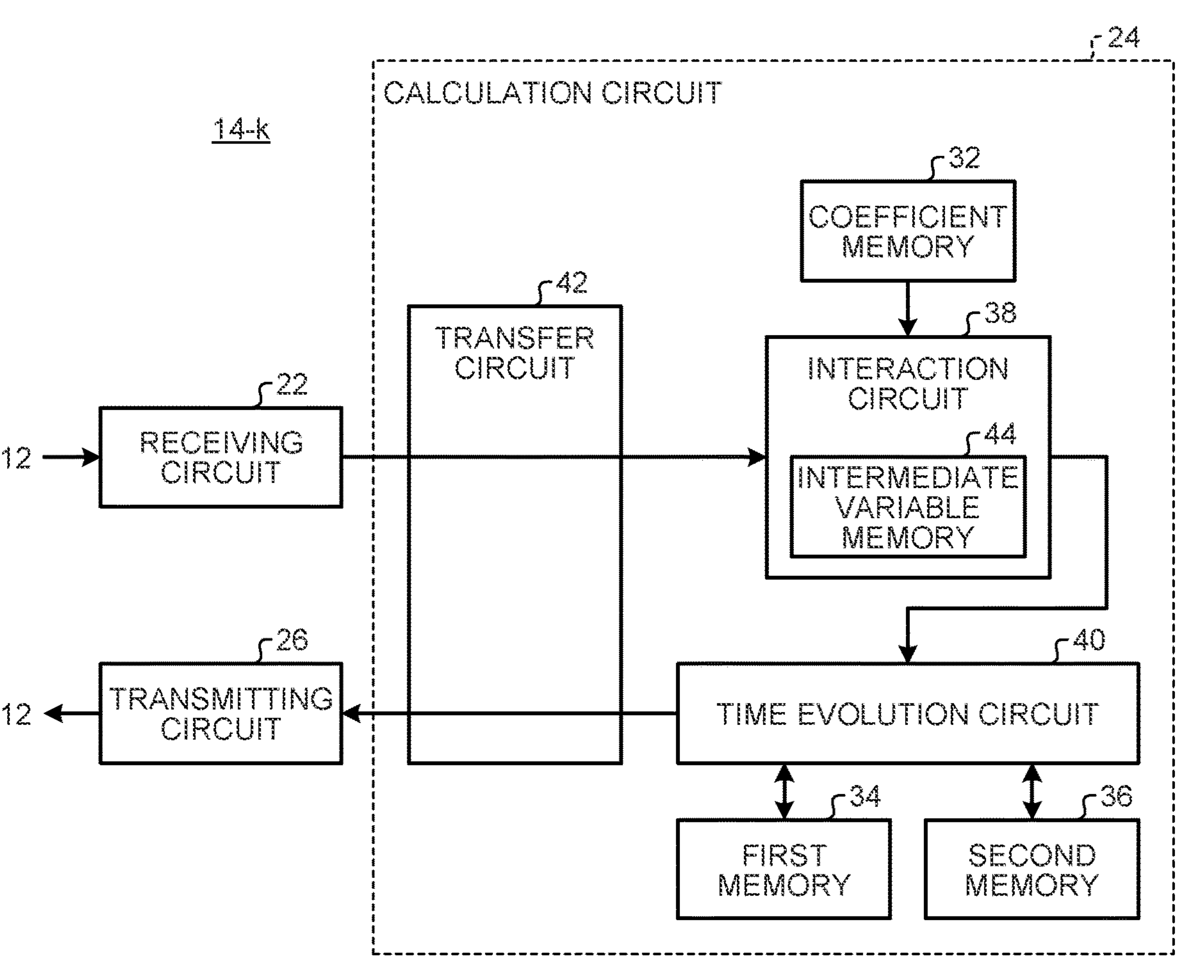
FIG. 15 is a diagram illustrating a configuration of the calculation core including a transfer circuit in a first example.

FIG. 15 is a diagram illustrating a configuration of the calculation core 14 including the transfer circuit 42 in a first example. For example, when the network 12 is a crossbar network, a shared bus, or the like and the first variables $x_i$ calculated by each of P calculation cores 14 are multicast, the transfer circuit 42 may have a configuration of the first example illustrated in FIG. 15. That is, the transfer circuit 42 may be configured to transfer N first variables $x_i$ received by the receiving circuit 22 directly to the interaction circuit 38 and transfer M first variables $x_i$ calculated by the time evolution circuit 40 directly to the transmitting circuit 26.

In this case, the receiving circuit 22 receives N first variables $x_i$ including M first variables $x_i$ calculated by the time evolution circuit 40 of the calculation core 14 itself, via the network 12. The interaction circuit 38 then sequentially acquires all of N first variables $x_i$ at the previous time step from the receiving circuit 22.

Figure 16:
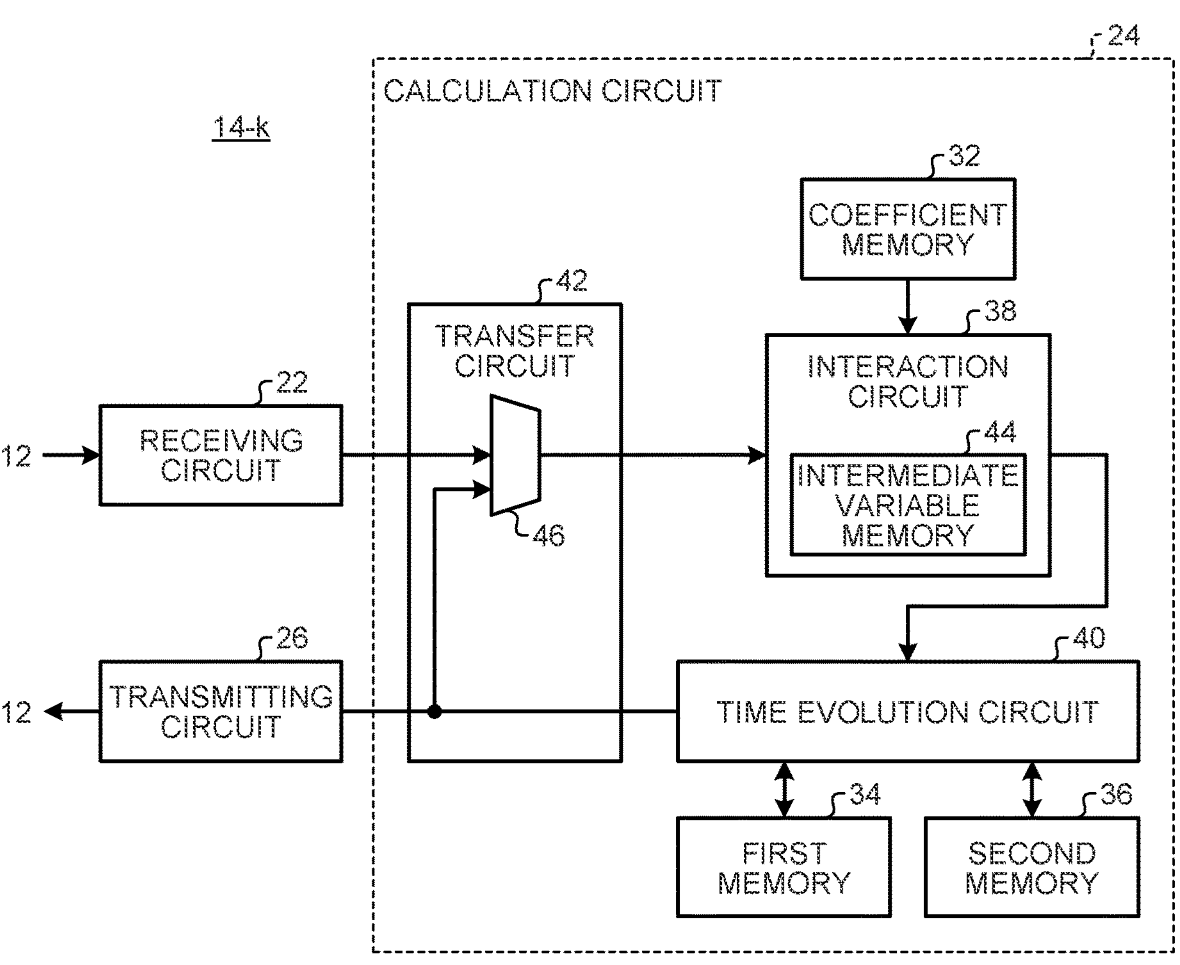
FIG. 16 is a diagram illustrating a configuration of the calculation core including the transfer circuit in a second example.

FIG. 16 is a diagram illustrating a configuration of the calculation core 14 including the transfer circuit 42 in a second example. For example, when the network 12 is a crossbar network, a shared bus, or the like and the first variables $x_i$ calculated by each of P calculation cores 14 are multicast, the transfer circuit 42 may have a configuration of the second example illustrated in FIG. 16. That is, the transfer circuit 42 may have a configuration including a first multiplexer 46. At each time step, the first multiplexer 46 time-multiplexes and supplies M first variables $x_i$ calculated by the time evolution circuit 40 and (N−M) first variables $x_i$ received by the receiving circuit 22 to the interaction circuit 38. The transfer circuit 42 in the second example also transfers M first variables $x_i$ calculated by the time evolution circuit 40 to the transmitting circuit 26.

For example, the first multiplexer 46 transfers M first variables $x_i$ calculated by the time evolution circuit 40 to the interaction circuit 38 before the initial first variable $x_i$ of (N−M) first variables $x_i$ is received by the receiving circuit 22. Such a transfer circuit 42 can shorten the time taken for the interaction circuit 38 to start operation. Such a transfer circuit 42 thus can expedite the completion of the computation by the interaction circuit 38.

Figure 17:
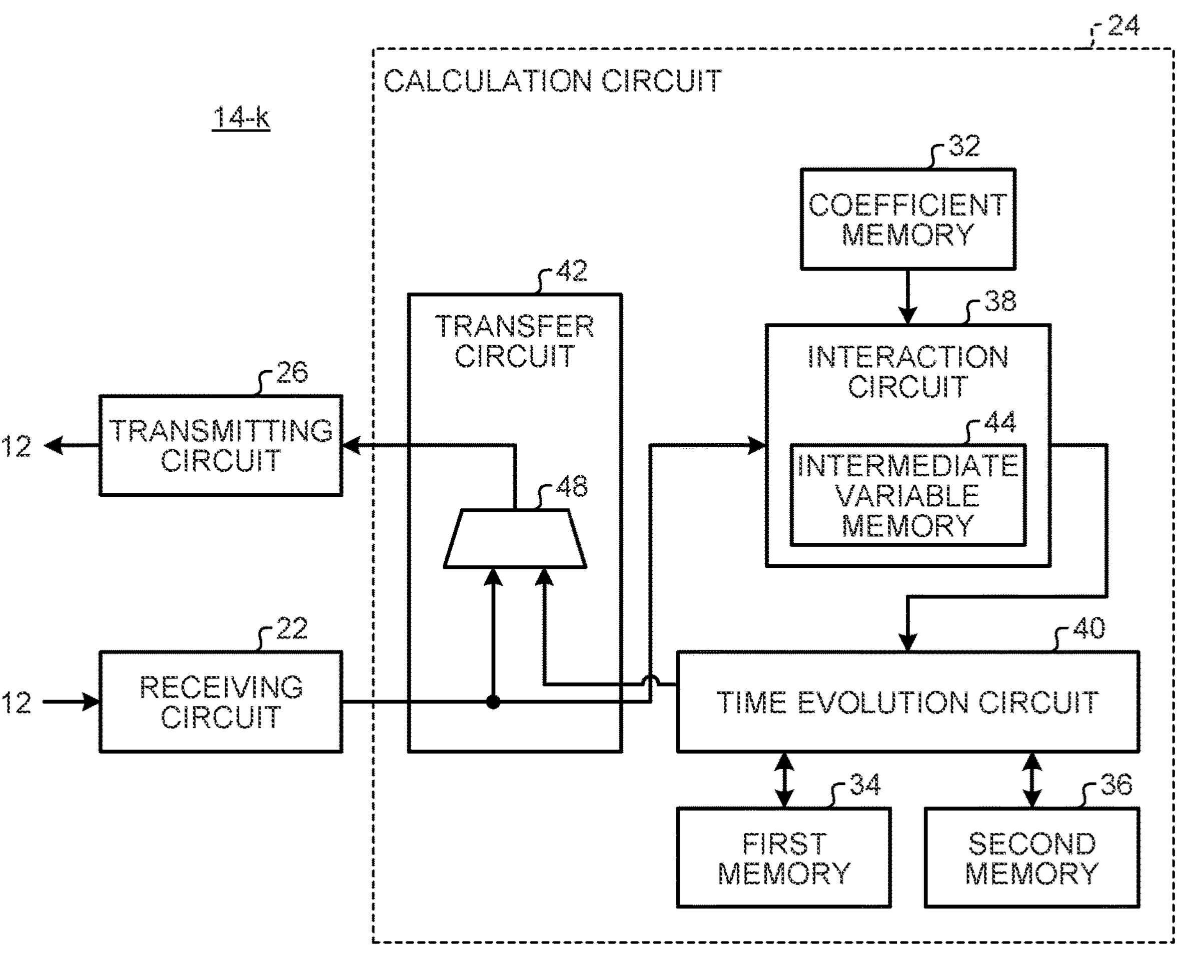
FIG. 17 is a diagram illustrating a configuration of the calculation core including the transfer circuit in a third example.

FIG. 17 is a diagram illustrating a configuration of the calculation core 14 including the transfer circuit 42 in a third example. For example, when the network 12 is a ring network and P calculation cores 14 transmit and receive N first variables $x_i$ in a bucket-brigade fashion, the transfer circuit 42 may have a configuration of the third example illustrated in FIG. 17. That is, the transfer circuit 42 may have a configuration including a second multiplexer 48. At each time step, the second multiplexer 48 time-multiplexes and supplies M first variables $x_i$ calculated by the time evolution circuit 40 and (N−M) first variables $x_i$ received by the receiving circuit 22 to the transmitting circuit 26. Furthermore, the transfer circuit 42 of the third example transfers N first variables $x_i$ received by the receiving circuit 22 directly to the interaction circuit 38.

In this case, the receiving circuit 22 receives N first variables $x_i$ including M first variables $x_i$ calculated by the time evolution circuit 40 of the calculation core 14 itself, via the network 12. The interaction circuit 38 then sequentially acquires all of N first variables $x_i$ at the previous time step from the receiving circuit 22.

Figure 18:
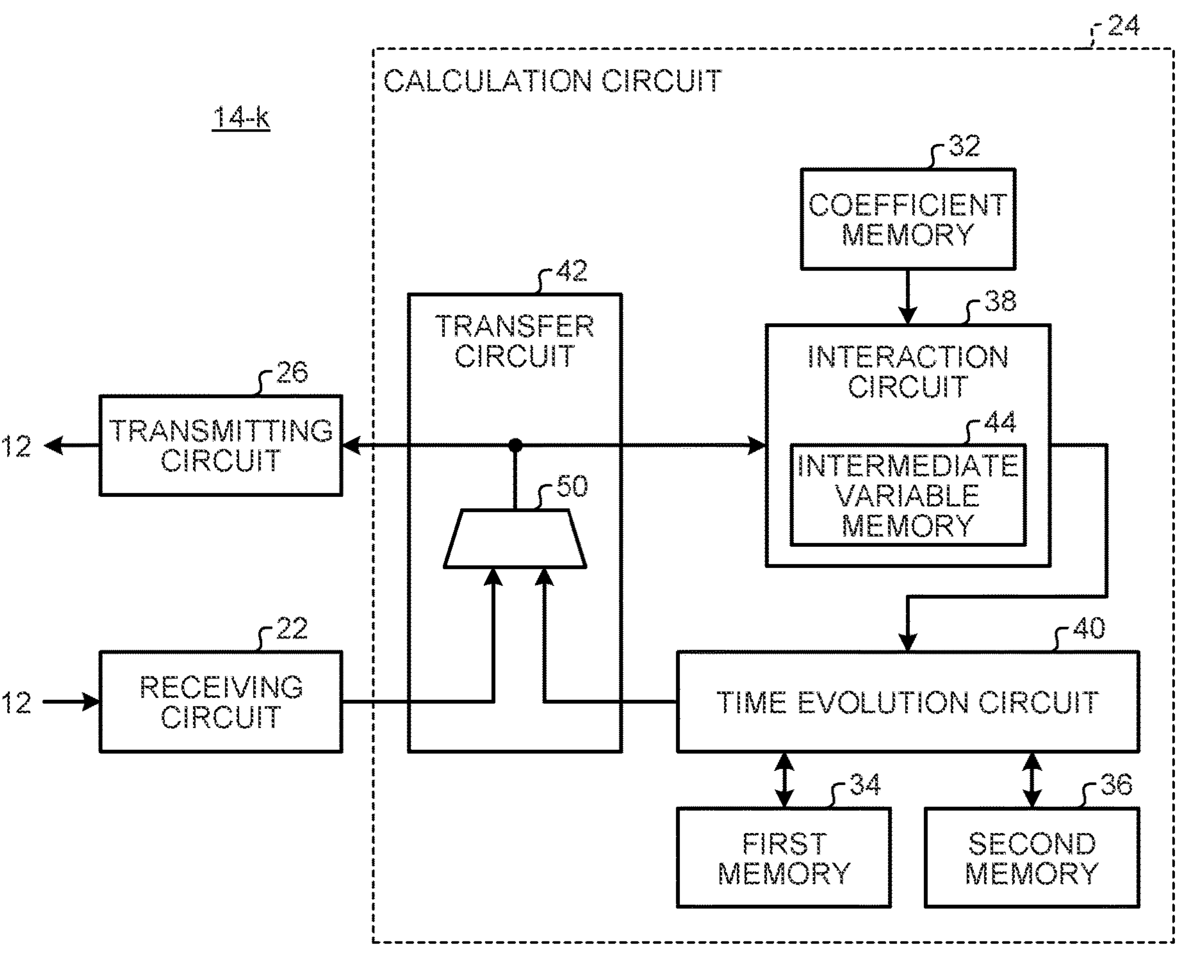
FIG. 18 is a diagram illustrating a configuration of the calculation core including the transfer circuit in a fourth example.

FIG. 18 is a diagram illustrating a configuration of the calculation core 14 including the transfer circuit 42 in a fourth example. For example, when the network 12 is a ring network and P calculation cores 14 transmit and receive N first variables $x_i$ in a bucket-brigade fashion, the transfer circuit 42 may have a configuration of the fourth example illustrated in FIG. 18. That is, the transfer circuit 42 may have a configuration including a third multiplexer 50. At each time step, the third multiplexer 50 time-multiplexes and supplies M first variables $x_i$ calculated by the time evolution circuit 40 and (N−M) first variables $x_i$ received by the receiving circuit 22 to both of the transmitting circuit 26 and the interaction circuit 38.

For example, the third multiplexer 50 starts transferring M first variables $x_i$ calculated by the time evolution circuit 40 to the interaction circuit 38 before the initial first variable $x_i$ of (N−M) first variables $x_i$ is received by the receiving circuit 22. Such a transfer circuit 42 can shorten the time taken for the interaction circuit 38 to start operation. Such a transfer circuit 42 thus can expedite the completion of the computation by the interaction circuit 38.

Figure 19:
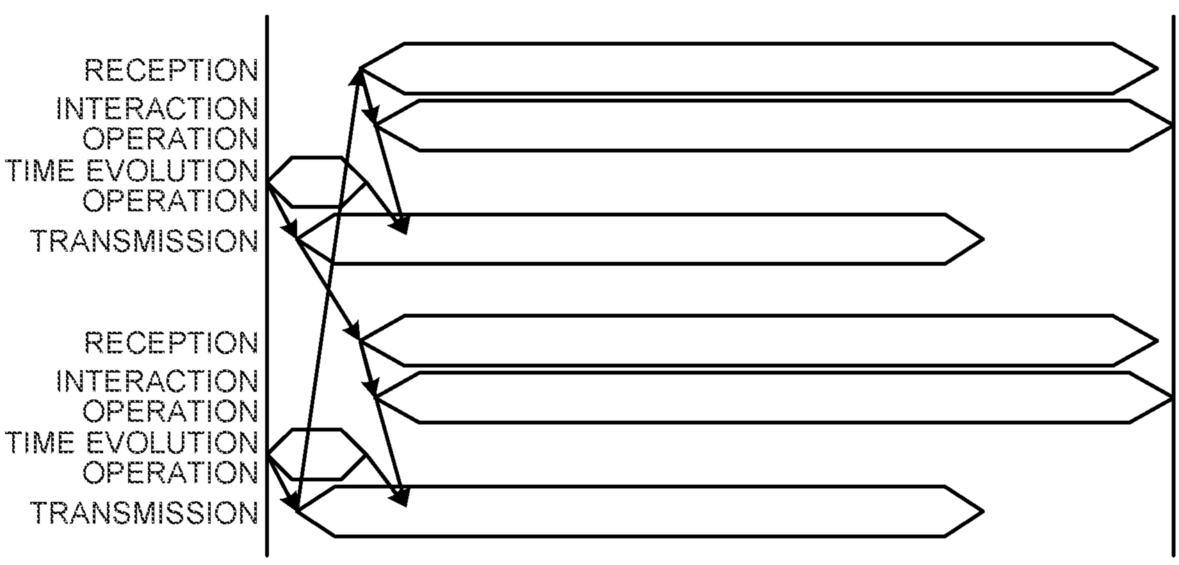
FIG. 19 is a diagram illustrating process timings of the calculation cores including the transfer circuit in the third example.
Figure 20:
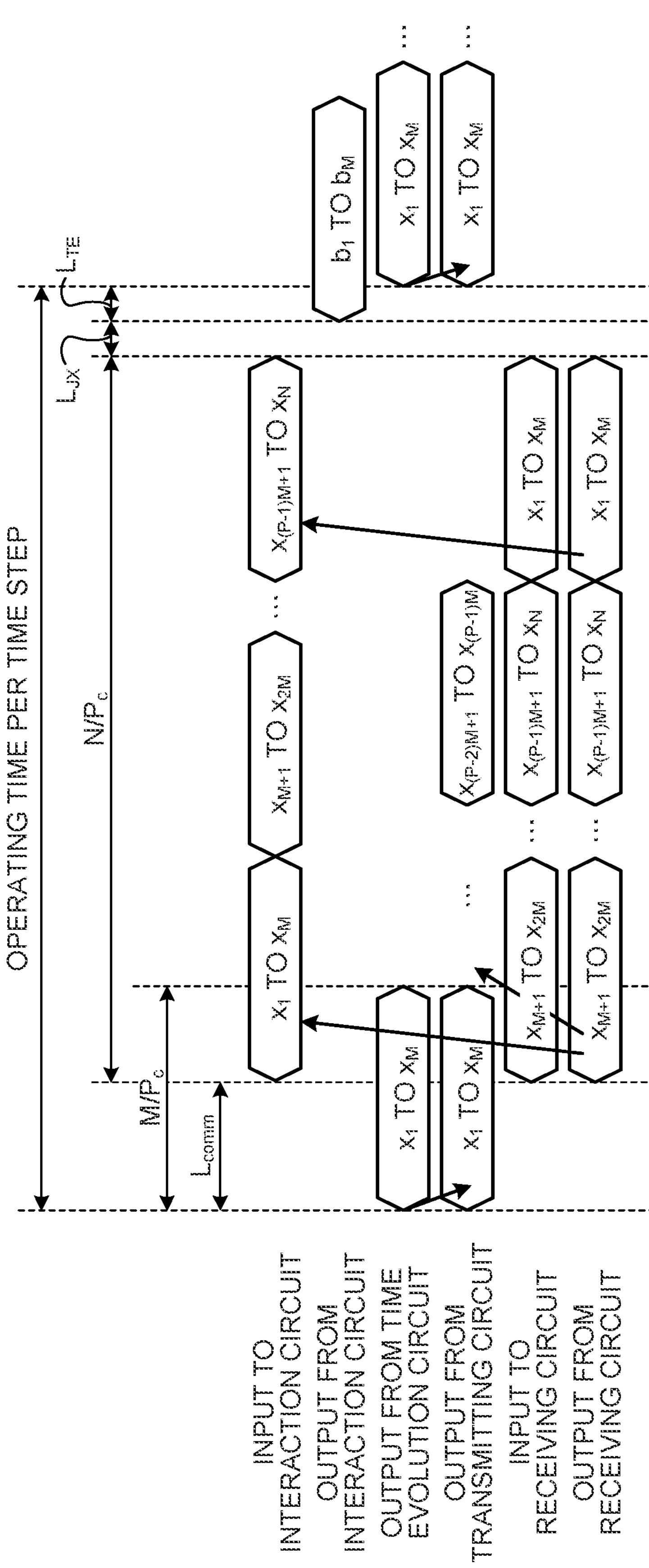
FIG. 20 is a diagram illustrating the details of process timings of the calculation core including the transfer circuit in the third example.

FIG. 19 is a diagram illustrating process timings of two calculation cores 14 each including the transfer circuit 42 in the third example. FIG. 20 is a diagram illustrating the details of process timing of one calculation core 14 including the transfer circuit 42 in the third example. Although FIG. 19 illustrates an example in which all the calculation cores 14 operate at the same timing, the operating timing may be shifted for each calculation core 14. The timing chart in FIG. 20 depicts timings assuming that the latency for data movement in the calculation core 14, the latency for data to pass through the receiving circuit 22, and the latency for data to pass through the transmitting circuit 26 are zero.

As illustrated in FIG. 19 and FIG. 20, the receiving circuit 22 receives N first variables $x_i$, M by M (where M=L=N/P) sequentially, via the network 12. The receiving circuit 22 then temporarily buffers the received M first variables $x_i$ and outputs the buffered first variables $x_i$ to the interaction circuit 38. The interaction circuit 38 then acquires N first variables $x_i$ M by M sequentially from the receiving circuit 22.

After all of N first variables $x_i$ are received, the interaction circuit 38 outputs the calculated M intermediate variables $b_i$ to the time evolution circuit 40. The time evolution circuit 40 then calculates M first variables $x_i$ and thereafter outputs the calculated M first variables $x_i$ to the transmitting circuit 26. The transmitting circuit 26 transmits M first variables $x_i$ received from the time evolution circuit 40 to the adjacent calculation core 14 via the network 12.

Furthermore, when the receiving circuit 22 receives M first variables $x_i$, the transmitting circuit 26 receives the received M first variables $x_i$ and transmits the received M first variables $x_i$ to the adjacent calculation core 14. P calculation cores 14 thus can transmit and receive N first variables $x_i$ in a bucket-brigade fashion.

Here, when the calculation core 14 includes the transfer circuit 42 in the third example, the receiving circuit 22 receives the initial M first variables $x_i$ after the communication latency between the calculation cores 14 has passed since M first variables $x_i$ calculated by the time evolution circuit 40 are transmitted via the network 12.

Then, when the calculation core 14 includes the transfer circuit 42 in the third example, the interaction circuit 38 starts the interaction operation for the initial M first variables $x_i$ after the communication latency between the calculation cores 14 has passed in the process at each time step.

$L_{comm}$ represents the communication latency between the calculation cores 14. $L_{JX}$ represents the time from when the acquisition of all N first variables $x_i$ is completed to when the interaction circuit 38 outputs M intermediate variables $b_i$. $L_{TE}$ represents the time from when the interaction circuit 38 outputs M intermediate variables $b_i$ to when the time evolution circuit 40 outputs M first variables $x_i$. $P_c$ represents the processing speed from when the time evolution circuit 40 acquires M intermediate variables $b_i$ to when M first variables $x_i$ are output and from when the receiving circuit 22 acquires the initial N first variables $x_i$ to when the interaction circuit 38 outputs M intermediate variables $b_i$.

Figure 21:
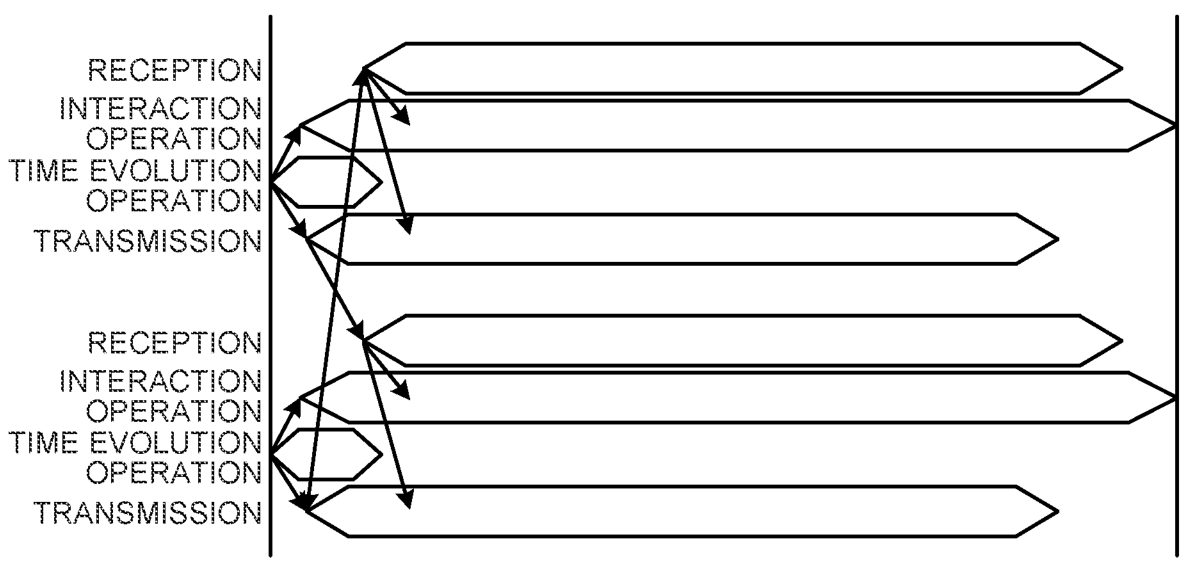
FIG. 21 is a diagram illustrating process timings of the calculation cores including the transfer circuit in the fourth example.
Figure 22:
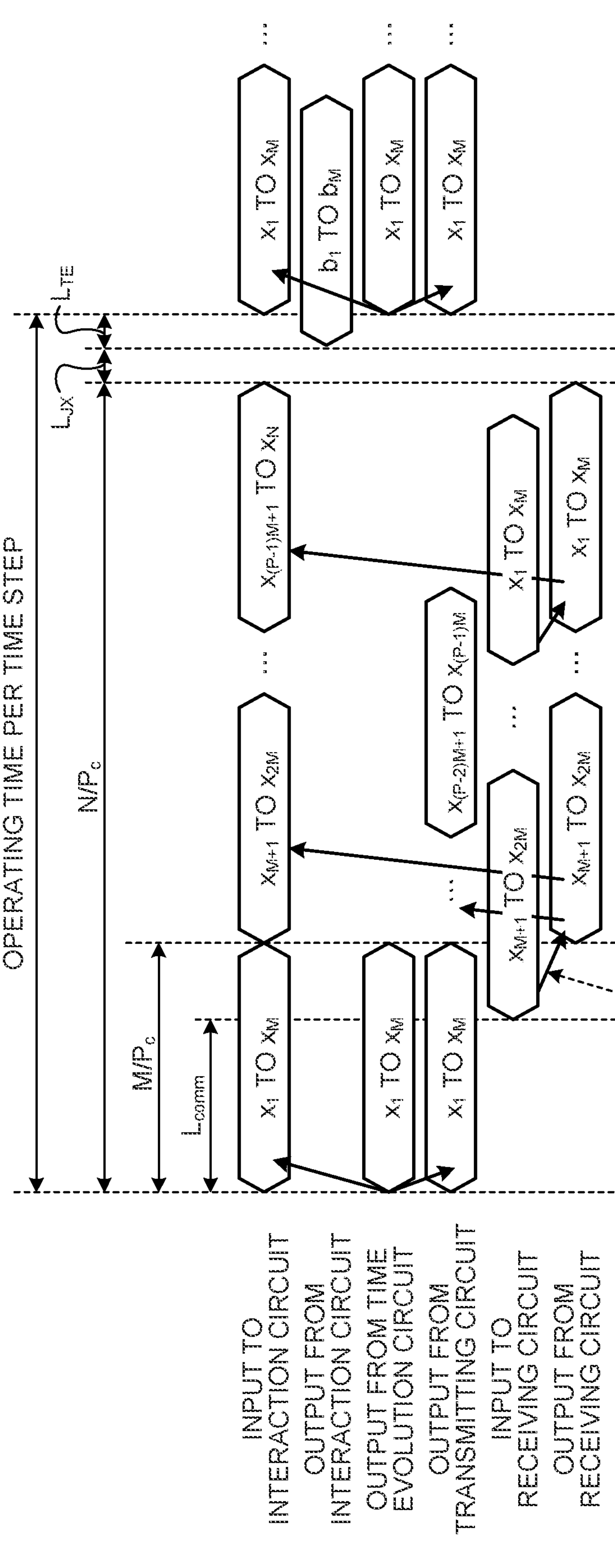
FIG. 22 is a diagram illustrating the details of process timings of the calculation core including the transfer circuit in the fourth example.

FIG. 21 is a diagram illustrating process timings of two calculation cores 14 each including the transfer circuit 42 in the fourth example. FIG. 22 is a diagram illustrating the details of process timing of one calculation core 14 including the transfer circuit 42 in the fourth example. Although FIG. 21 illustrates an example in which all the calculation cores 14 operate at the same timing, the operating timing may be shifted for each calculation core 14. The timing chart in FIG. 22 depicts timings assuming that the latency for data movement in the calculation core 14, the latency for data to pass through the receiving circuit 22, and the latency for data to pass through the transmitting circuit 26 are zero.

When the calculation core 14 includes the transfer circuit 42 in the fourth example, the interaction circuit 38 acquires M first variables $x_i$ output by the time evolution circuit 40 directly from the time evolution circuit 40 without going through the network 12.

The interaction circuit 38 therefore can start the computation process on M first variables $x_i$ output by the time evolution circuit 40 before the initial M first variables $x_i$ are received from the adjacent calculation core 14 in the process at each time step. The receiving circuit 22 has an internal buffer in the inside and buffers the received M first variables $x_i$ until the interaction operation on the previous M first variables $x_i$ by the interaction circuit 38 is completed.

The calculation core 14 including the transfer circuit 42 in the fourth example can reduce the process time per time step, compared with the case including the transfer circuit 42 in the third example.

Figure 24:
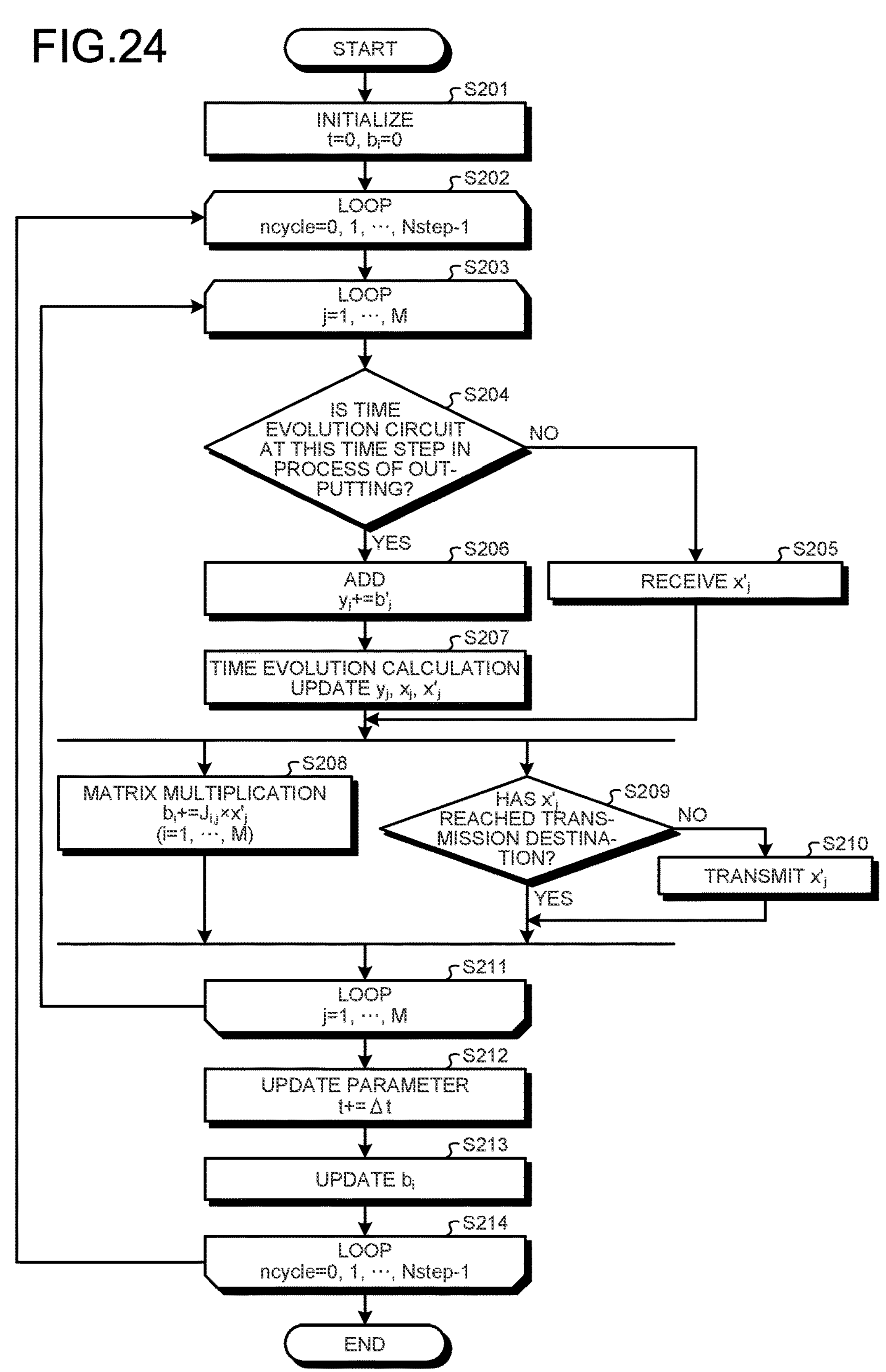
FIG. 24 is a flowchart illustrating the process according to the pseudocode.

FIG. 23 is a diagram illustrating pseudocode 52 describing the process in the calculation core 14 including the transfer circuit 42 in the fourth example. FIG. 24 is a flowchart illustrating the process in the calculation core 14 when the process is performed according to the pseudocode 52.

When the transfer circuit 42 in the fourth example is included, the calculation core 14 performs the process illustrated FIG. 23 and FIG. 24.

In the pseudocode 52 and the flowchart, t is a variable representing time. Δt is a constant representing a time step. i is an index that identifies M oscillators assigned to the calculation core 14 among N oscillators. j is an index that identifies N oscillators.

$b_i$ is an intermediate variable stored in the intermediate variable memory 44 and being under calculation in the interaction operation. $b'_i$ is an intermediate variable that is stored in a buffer provided in the interaction circuit 38, in the time evolution circuit 40, or between the interaction circuit 38 and the time evolution circuit 40 and is the final computation result of the interaction operation.

$x_j$ is the first variable. $x'_j$ is the first variable obtained by multiplying $x_j$ by a constant (Δt×c). $y_j$ is the second variable. When the process according to the pseudocode 52 is performed, each of P calculation cores 14 transmits $x'_j$ to the other calculation cores 14 via the network 12.

First of all, at S201, the calculation core 14 initializes parameters. S201 corresponds to the process from lines 1 to 6 of the pseudocode 52. Specifically, in line 1, the calculation core 14 sets t to 0. In line 2, the calculation core 14 divides N by P to calculate M representing the number of virtual oscillators assigned to the calculation core 14. In lines 3 to 6, the calculation core 14 initializes each of M $b_i$ to $b_M$ and M $b'_1$ to b'M to 0.

Subsequently, the calculation core 14 performs the loop between S202 and S214. The loop between S202 and S214 corresponds to lines 7 to 31 of the pseudocode 52. Specifically, in the first loop, the calculation core 14 substitutes 0 for ncycle that is a variable representing the number of iterations, adds 1 to ncycle for each iteration, and exits the loop when ncycle is equal to or greater than Nstep representing the preset number of times of iterations.

Subsequently, in the loop between S202 and S214, the calculation core 14 performs a loop between S203 and S211. The loop process between S203 and S211 corresponds to lines 8 to 25 of the pseudocode 52. Specifically, the calculation core 14 substitutes 1 for j in the first loop, adds 1 to j for each iteration, and exits the loop when j is greater than N.

In the loop between S203 and S211, first, at S204, the calculation core 14 determines whether the time evolution circuit 40 is in the process of outputting $x'_i$. S204 corresponds to line 9 of the pseudocode 52. Specifically, the calculation core 14 determines whether j is less than or equal to M.

If the time evolution circuit 40 is not in the process of outputting $x'_i$ (No at S204), the calculation core 14 receives $x'_i$ at S205. S205 corresponds to line 16 of the pseudocode 52. Specifically, the calculation core 14 substitutes the value received by the receiving circuit 22 for $x'_j$.

If the time evolution circuit 40 is in the process of outputting $x_i$ (Yes at S204), the process at S206 and S207 is performed. At S206, the calculation core 14 adds $b'_j$ to $y_j$. S206 corresponds to line 11 of the pseudocode 52.

At S207, the time evolution circuit 40 updates $y_j$, $x_j$, and $x'_j$. S206 corresponds to lines 12, 13, and 14 of the pseudocode 52. In line 12, the time evolution circuit 40 updates $y_j$ by the FX function that updates $y_j$ with $x_j$. In line 13, the time evolution circuit 40 updates $x_j$ by the FY function that updates $x_j$ with $y_j$. In line 14, the time evolution circuit 40 calculates $x'_j$ by multiplying $x_j$ by dt×c.

Following the process at S205 or S207, the calculation core 14 performs S208 and S209 to S210 in parallel. At S208, for each of i=1 to i=M, the calculation core 14 multiplies $x'_j$ received at S205 by the corresponding coupling coefficient $J_{i,j}$ and cumulatively adds the multiplication value to the corresponding $b_i$. S208 corresponds to lines 18 to 21 of the pseudocode 52. Specifically, the calculation core 14 substitutes 1 for i in line 18, adds 1 to i every time the cumulative addition is performed, and terminates the cumulative addition process when i becomes greater than M.

At S209, the calculation core 14 determines whether $x'_j$ has reached the adjacent calculation core 14 that is the destination of $x'_i$. If $x'_j$ has not reached (No at S209), at S210, the calculation core 14 transmits $x'_j$ to the adjacent calculation core 14. If it has reached (Yes at S209), the calculation core 14 skips the process at 3210. S209 to S210 correspond to lines 22 to 24 of the pseudocode 52. Specifically, if j is less than or equal to M×(P−1), the calculation core 14 transmits $x'_j$ to the adjacent calculation core 14.

If the loop process between S203 and S211 is finished, the calculation core 14 proceeds to S212. At S212, the calculation core 14 updates t by adding Δt to t. S212 corresponds to line 26 of the pseudocode 52.

Subsequently, at S213, the calculation core 14 updates each of M $b'_i$ and M $b_i$. S213 corresponds to lines 27 to 29 of the pseudocode 52. Specifically, for each of i=1 to i=M, the calculation core 14 substitutes $b_i$ for $b'_i$ and then substitutes 0 for $b_i$. The calculation core 14 thus can transfer the value stored in the intermediate variable memory 44 to the buffer that stores the intermediate variable $b'_i$ that is the final computation result of the interaction operation.

The calculation core 14 then repeats the loop between S202 and S214 Nstep times and thereafter terminates the process.

Figure 25:
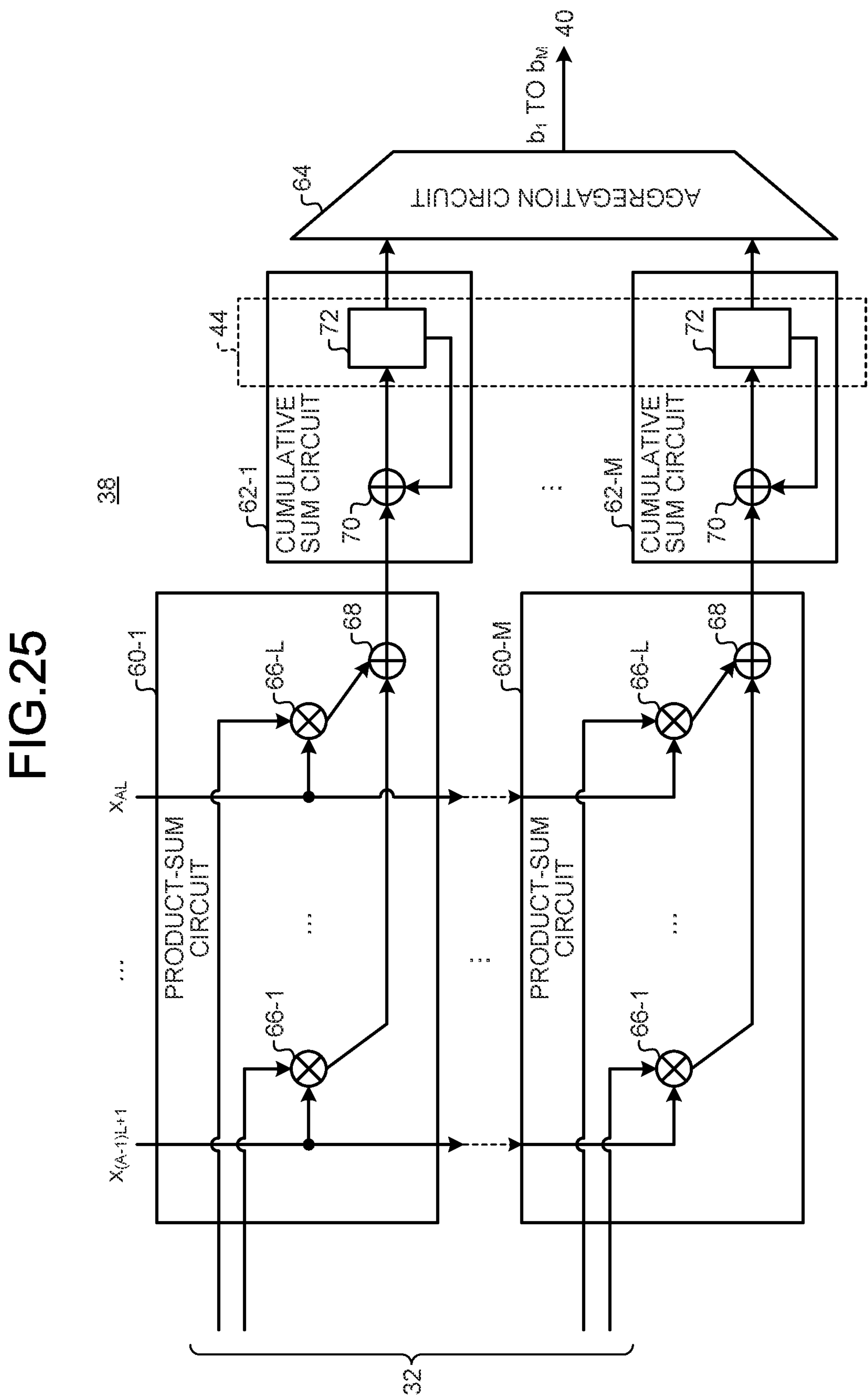
FIG. 25 is a diagram illustrating a configuration of an interaction circuit according to a first example.

FIG. 25 is a diagram illustrating a configuration of the interaction circuit 38 according to a first example. The interaction circuit 38 according to the first example is a configuration in which each of P calculation cores 14 receives N first variables $x_1$ to $x_N$ sequentially in units of L first variables $x_1$ (L is equal to or greater than 1 and less than N). This is applicable to the interaction circuit 38 according to the following second and third examples.

The interaction circuit 38 according to the first to third examples performs the matrix multiplication process as the interaction operation and does not perform the bias addition process. That is, the interaction circuit 38 according to the first to third examples does not add the bias coefficient $h_i$ to the intermediate variable $b_i$.

The interaction circuit 38 according to the first example has M product-sum circuits 60-1 to 60-M, M cumulative sum circuits 62-1 to 62-M, and an aggregation circuit 64.

M product-sum circuits 60-1 to 60-M correspond one-to-one with M oscillators assigned to the calculation core 14. Each of M product-sum circuits 60-1 to 60-M includes L multipliers 66 and a first adder 68. Every time the interaction circuit 38 acquires a set of L first variables $x_{(A-1)L+1}$ to $x_{AL}$ (A is an integer number not less than 1), each of L multipliers 66 multiplies the corresponding one first variable $x_i$ of L first variables $x_{(A-1)L+1}$ to $x_{AL}$ by the corresponding coupling coefficient $J_{i,j}$ contained in the coupling matrix J stored in the coefficient memory 32. The first adder 68 adds the multiplication results of all of L multipliers 66. The first adder 68 then outputs a product-sum value by adding the multiplication results of all of L multipliers 66.

Each of M product-sum circuits 60-1 to 60-M according to the first example is configured to perform the product-sum operation on L first variables $x_{(A-1)L+1}$ to $x_{AL}$ in one clock cycle, but the embodiments are not limited to this configuration. For example, each of M product-sum circuits 60-1 to 60-M according to the first example may be a circuit that performs the product-sum operation on L first variables $x_{(A-1)L+1}$ to $x_{AL}$ in a plurality of clocks.

M cumulative sum circuits 62-1 to 62-M correspond one-to-one with M oscillators assigned to the calculation core 14. Each of M cumulative sum circuits 62-1 to 62-M includes a second adder 70 and a register 72. Every time a set of L first variables $x_{(A-1)L+1}$ to $x_{AL}$ is acquired, each of M cumulative sum circuits 62-1 to 62-M acquires a product-sum value from the corresponding one product-sum circuit 60 among M product-sum circuits 60-1 to 60-M. Every time a product-sum value is acquired from the corresponding product-sum circuit 60, the second adder 70 adds the acquired product-sum value to the value stored in the register 72 and writes the addition result in the register 72 again. The register 72 stores a value and has the stored value updated every time a product-sum value is acquired from the corresponding product-sum circuit 60.

The register 72 included in each of M cumulative sum circuits 62-1 to 62-M functions as the intermediate variable memory 44. That is, in this example, the intermediate variable memory 44 includes M registers 72. The register 72 included in each of M cumulative sum circuits 62-1 to 62-M stores M intermediate variables $b_i$ under calculation that are calculated while the interaction operation is performed on N first variables $x_i$ portion by portion sequentially.

After the computation on all of N first variables $x_i$ is completed, the aggregation circuit 64 reads the values stored in M registers 72 functioning as the intermediate variable memory 44 and supplies the read values to the time evolution circuit 40 as M intermediate variables $b_i$ to $b_M$. In this case, at each time step, the aggregation circuit 64 time-divisionally aggregates and supplies each of M intermediate variables $b_i$ to $b_M$ stored in M registers 72 functioning as the intermediate variable memory 44, to the time evolution circuit 40.

When the time evolution circuit 40 performs parallel computation by a plurality of circuits, the interaction circuit 38 may include a plurality of aggregation circuits 64. In this case, each of the aggregation circuits 64 selects corresponding some of intermediate variables $b_i$ among M intermediate variables $b_1$ to $b_M$ and supplies the selected some to a circuit among the circuits included in the time evolution circuit 40.

Figure 26:
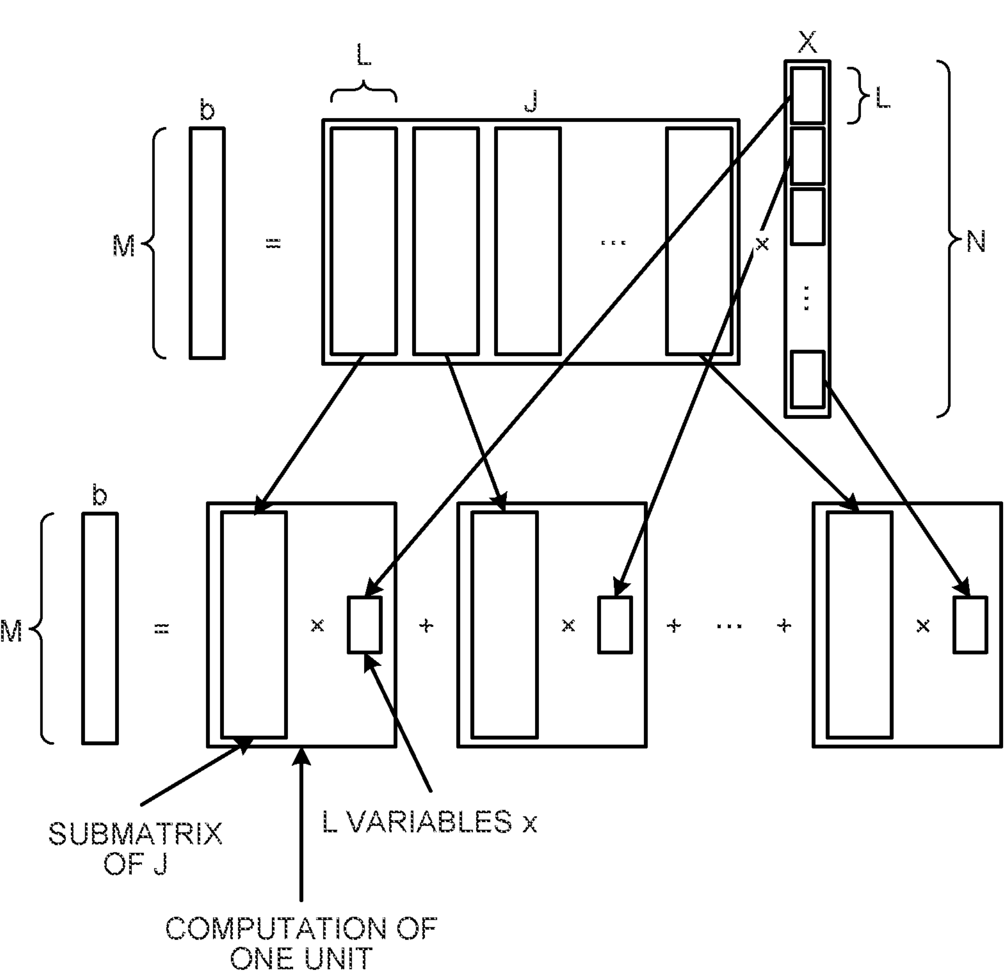
FIG. 26 is a diagram illustrating a computation process of the interaction circuit according to the first example.

FIG. 26 is a diagram illustrating a computation process of the interaction circuit 38 according to the first example illustrated in FIG. 25. Every time L first variables $x_i$ are acquired, the interaction circuit 38 according to the first example having the configuration illustrated in FIG. 25 can perform the product-sum operation of an M row by L column submatrix corresponding to the acquired L first variables $x_i$ among the preset M row by N column coefficients, and the acquired L first variables $x_i$, row by row.

The interaction circuit 38 according to the first example then cumulatively adds the product-sum value every time L first variables $x_i$ are acquired. The interaction circuit 38 according to the first example thus can store M intermediate variables $b_i$ under calculation that are calculated while the product-sum operation is performed on N first variables $x_i$ L by L sequentially, in the intermediate variable memory 44.

FIG. 27 is a diagram illustrating a configuration of the interaction circuit 38 according to a second example. The interaction circuit 38 according to the second example includes (M/2) product-sum circuits 60-1 to 60-M/2, (M/2) cumulative sum circuits 62-1 to 62-(M/2), and an aggregation circuit 64.

Each of (M/2) product-sum circuits 60-1 to 60-M/2 corresponds exclusively to two of M oscillators assigned to the calculation core 14.

Each of (M/2) product-sum circuits 60-1 to 60-M/2 has a configuration similar to that of the product-sum circuit 60 according to the first example. However, each of (M/2) product-sum circuits 60-1 to 60-M/2 sequentially outputs two product-sum values every time a set of L first variables $x_{(A-1)L+1}$ to $x_{AL}$ are acquired. Specifically, in the first cycle, each of (M/2) product-sum circuits 60-1 to 60-M/2 performs the product-sum operation of L first variables $x_{(A-1)L+1}$ to $x_{AL}$ and L coupling coefficients $J_{i,j}$ included in the row corresponding to one of the two corresponding oscillators in the coupling matrix J. In the second cycle, each of (M/2) product-sum circuits 60-1 to 60-M/2 performs the product-sum operation of L first variables $x_{(A-1)L+1}$ to $x_{AL}$ and L coupling coefficients $J_{i,j}$ included in the row corresponding to the other of the two corresponding oscillators in the coupling matrix J.

Each of (M/2) cumulative sum circuits 62-1 to 62-M/2 corresponds exclusively to two of M oscillators assigned to the calculation core 14.

Each of (M/2) cumulative sum circuits 62-1 to 62-M/2 includes a second adder 70, a first register 72-1, and a second register 72-2. Every time a set of L first variables $x_{(A-1)L+1}$ to $x_{AL}$ is acquired, each of (M/2) product-sum circuits 60-1 to 60-M/2 sequentially acquires two product-sum values from the corresponding one product-sum circuit 60 among (M/2) product-sum circuits 60-1 to 60-M/2. In the first cycle, the second adder 70 adds the acquired product-sum value to the value stored in the first register 72-1 and writes the addition result in the first register 72-1 again. In the second cycle, the second adder 70 adds the acquired product-sum value to the value stored in the second register 72-2 and writes the addition result in the second register 72-2 again.

The first register 72-1 and the second register 72-2 included in each of (M/2) cumulative sum circuits 62-1 to 62-M/2 function as the intermediate variable memory 44.

After the computation on all of N first variables $x_i$ is completed, the aggregation circuit 64 reads the values stored in the first register 72-1 and the second register 72-2 functioning as the intermediate variable memory 44 and supplies the read values to the time evolution circuit 40 as M intermediate variables $b_1$ to $b_M$.

Figure 28:
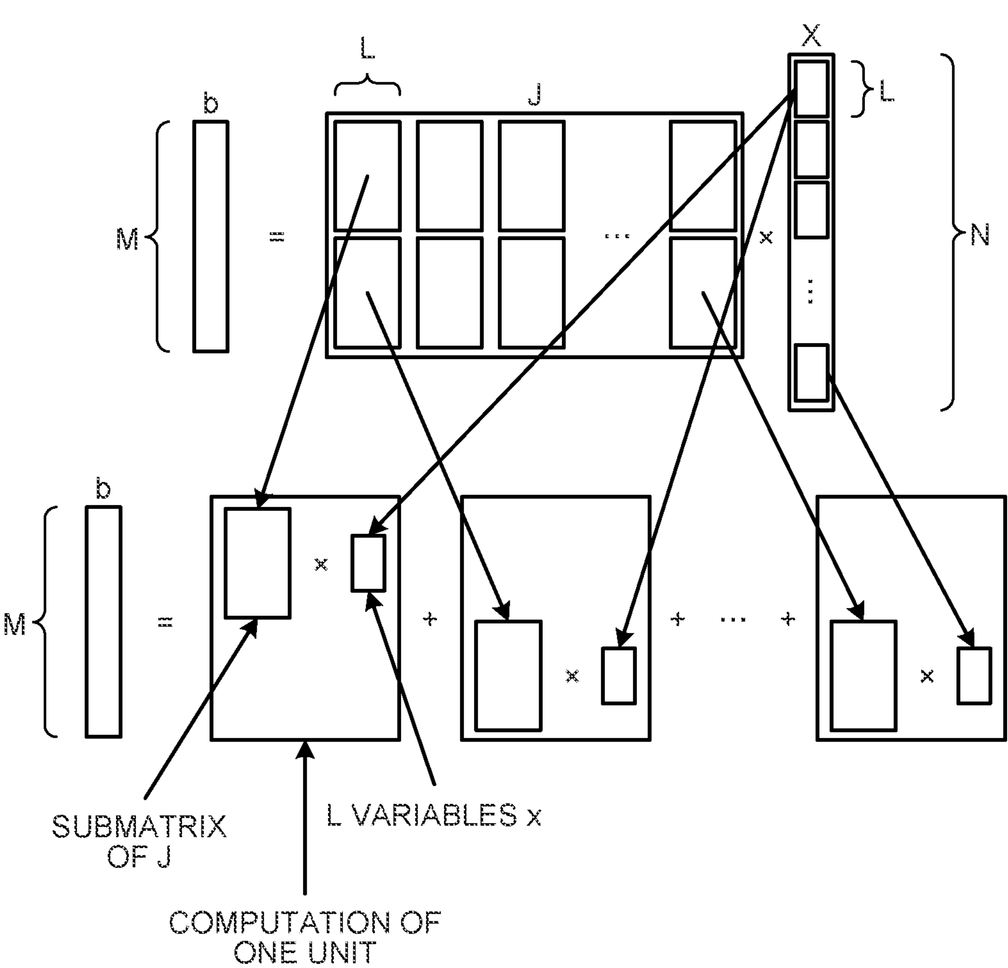
FIG. 28 is a diagram illustrating a computation process of the interaction circuit according to the second example.

FIG. 28 is a diagram illustrating a computation process of the interaction circuit 38 according to the second example illustrated in FIG. 27. The interaction circuit 38 according to the second example having the configuration illustrated in FIG. 27 performs the product-sum operation process of two cycles every time L first variables $x_i$ are acquired. In each cycle, the interaction circuit 38 can perform the product-sum operation of a (M/2) row by L column submatrix corresponding to the acquired L first variables $x_i$ among the preset M row by N column coefficients, and the acquired L first variables $x_i$, row by row.

The interaction circuit 38 according to the second example then cumulatively adds two product-sum values as different intermediate variables $b_i$ every time L first variables $x_i$ are acquired. Therefore, the interaction circuit 38 according to the second example stores M intermediate variables $b_i$ under calculation that are calculated while product-sum operation is performed on N first variables $x_i$ L by L sequentially, in the intermediate variable memory 44.

The interaction circuit 38 according to the second example includes (M/2) product-sum circuits 60-1 to 60-M/2 and (M/2) cumulative sum circuits 62-1 to 62-M/2 but may include (M/4) product-sum circuits 60-1 to 60-M/4 and (M/4) cumulative sum circuits 62-1 to 62-M/4. In this case, each of (M/4) product-sum circuits 60-1 to 60-M/4 performs the product-sum operation process of four cycles every time L first variables $x_i$ are acquired. In this case, each of (M/4) cumulative sum circuits 62-1 to 62-M/4 includes a first register 72-1 to a fourth register 72-4. The interaction circuit 38 may include any other number of product-sum circuits 60 and cumulative sum circuits 62.

Figure 29:
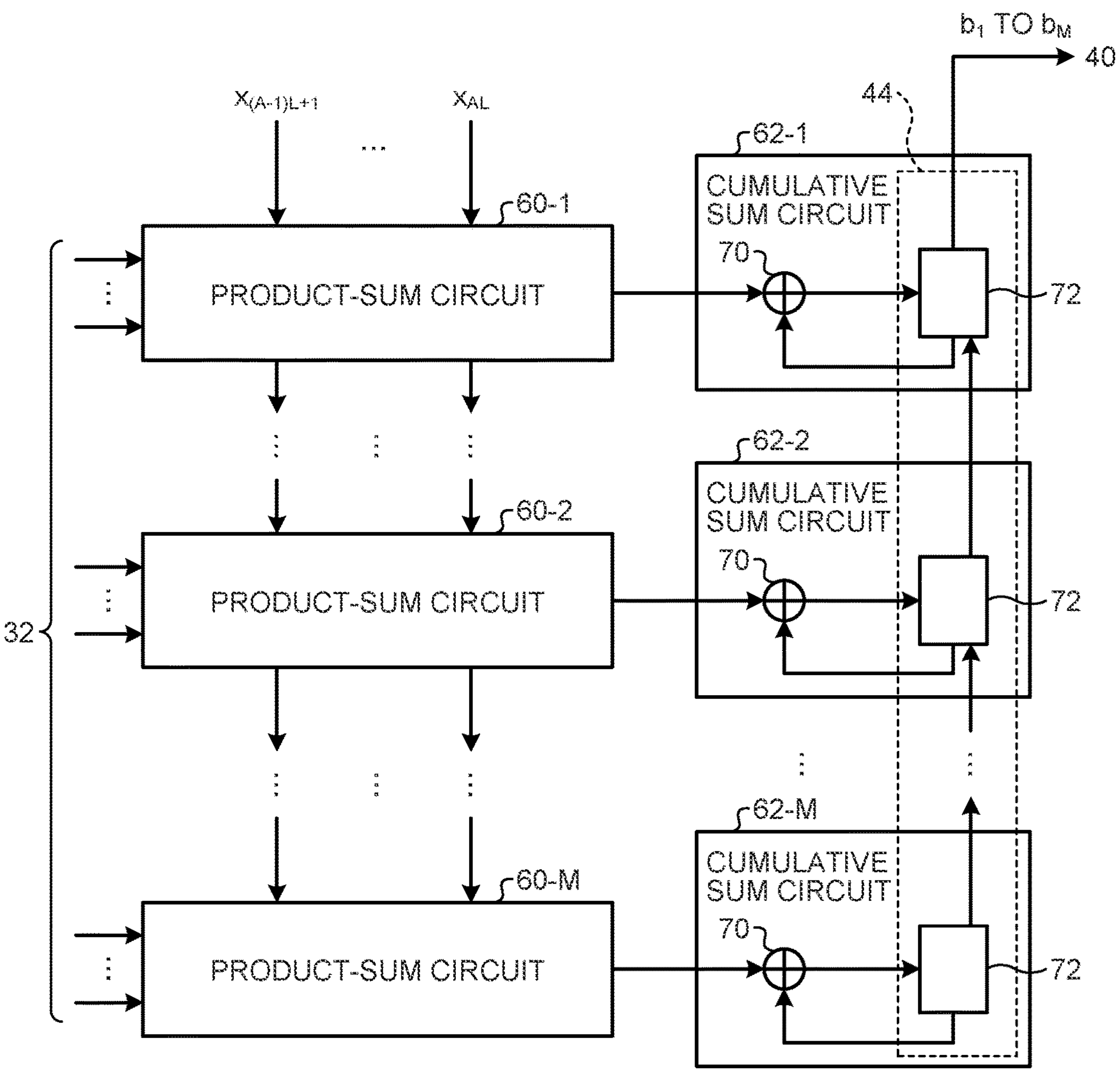
FIG. 29 is a diagram illustrating a configuration of the interaction circuit according to a third example.

FIG. 29 is a diagram illustrating a configuration of the interaction circuit 38 according to a third example. The interaction circuit 38 according to the third example includes M product-sum circuits 60-1 to 60-M and M cumulative sum circuits 62-1 to 62-M. The interaction circuit 38 according to the third example does not include the aggregation circuit 64, compared with the interaction circuit 38 according to the first example.

In the third example, M registers 72 included in M cumulative sum circuits 62-1 to 62-M are connected in series. M registers 72 function as a shift register that transfers the stored value to the adjacent register 72 in the series direction.

After the computation on all of N first variables $x_i$ is completed, the interaction circuit 38 allows M registers 72 to function as a shift register and sequentially supplies M intermediate variables $b_1$ to $b_M$ to the time evolution circuit 40.

M registers 72 may be arranged in a plurality of columns and connected for each column. In this case, M registers 72 function as a plurality of shift registers that transfer the stored value to the adjacent register in the series direction for each column. After the computation on all of the N first variables $x_i$ is completed, the interaction circuit 38 allows M registers 72 to function as a plurality of shift registers and supplies M intermediate variables $b_1$ to $b_M$ to the time evolution circuit 40 sequentially in the predetermined degree of parallelism.

The interaction circuit 38 according to the third example can sequentially supply M intermediate variables $b_1$ to $b_M$ to the time evolution circuit 40 after the interaction operation is completed. The interaction circuit 38 may be configured such that all of the first registers 72-1 and the second registers 72-2 included in (M/2) cumulative sum circuits 62-1 to 62-M/2 in the second example are connected in series to function as a shift register.

Figure 30:
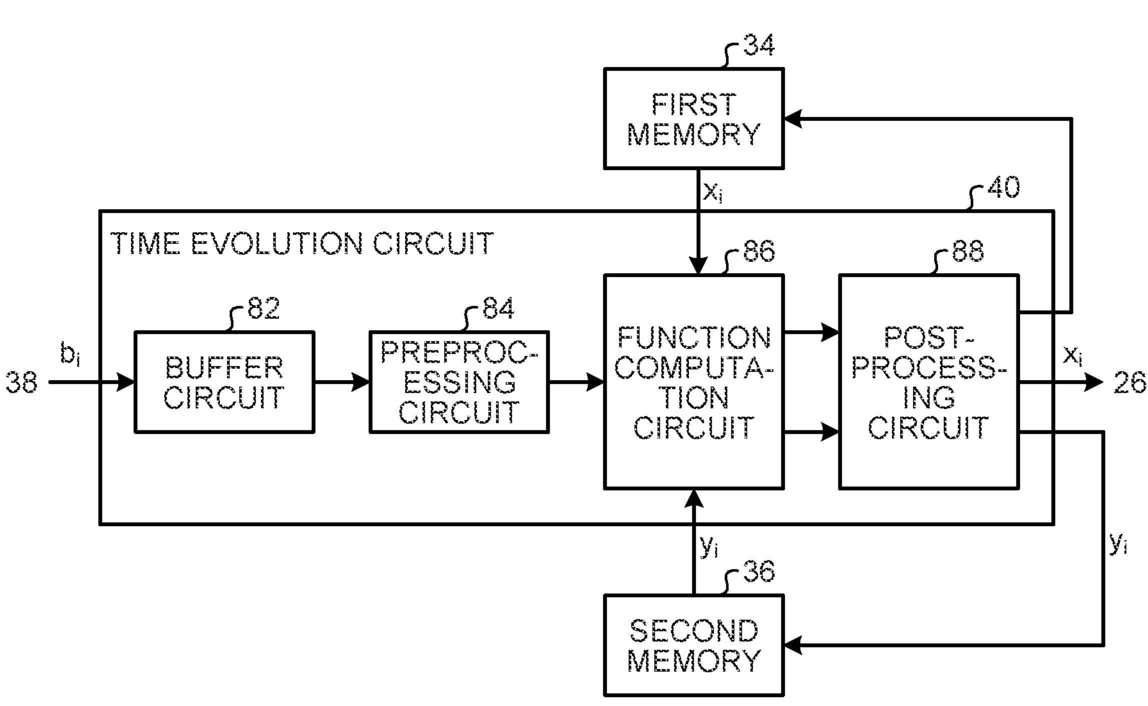
FIG. 30 is a diagram illustrating a configuration of a time evolution circuit together with a first memory and a second memory.

FIG. 30 is a diagram illustrating a configuration of the time evolution circuit 40 together with the first memory 34 and the second memory 36.

The time evolution circuit 40 includes a buffer circuit 82, a preprocessing circuit 84, a function computation circuit 86, and a postprocessing circuit 88.

At each time step, the buffer circuit 82 acquires and stores M intermediate variables $b_i$ output from the interaction circuit 38. The buffer circuit 82 may be provided on the outside of the time evolution circuit 40 or may be provided at the output stage of the interaction circuit 38.

At each time step, the preprocessing circuit 84 performs a predetermined computation process on each of M intermediate variables $b_i$ stored in the buffer circuit 82. For example, the preprocessing circuit 84 multiplies each of M intermediate variables $b_i$ by a coefficient or adds or subtracts a constant. When a computation process is not performed on each of M intermediate variables $b_i$, the time evolution circuit 40 does not include the preprocessing circuit 84.

The function computation circuit 86 acquires M intermediate variables $b_i$ subjected to a predetermined computation process by the preprocessing circuit 84. When the time evolution circuit 40 does not include the preprocessing circuit 84, the function computation circuit 86 acquires the intermediate variable $b_i$ from the buffer circuit 82.

Furthermore, the function computation circuit 86 reads the first variable $x_i$ at the previous time step corresponding to each of M intermediate variables $b_i$, from the first memory 34. In addition, the function computation circuit 86 reads the second variable $y_i$ at the previous time step corresponding to each of M intermediate variables $b_i$, from the second memory 36. The function computation circuit 86 then calculates M first variables $x_i$ and M second variables $y_i$ at the target time step.

For example, the function computation circuit 86 calculates the second variable $y_i$ at the target time step by performing the computation given by Equation (6) using the intermediate variable $b_i$ and the first variable $x_i$ at the previous time step.

$$y_i = y_i + FX(x_i) + dt \times c \times b_i \qquad (6)$$

$$FX(x_i) = dt \times \{-D + p(t) - Kx_i^2\}x_i$$

Furthermore, following the computation given by Equation (6), the function computation circuit 86 calculates the first variable $x_i$ at the target time step by performing the computation given by Equation (7) using the second variable $y_i$ at the target time step.

$$x_i = x_i + FY(y_i) \quad (7)$$
$$FY(y_i) = dt \times D \times y_i$$

The function computation circuit 86 may reverse the order of computation of Equation (6) and Equation (7). That is, the function computation circuit 86 may calculate the first variable $x_i$ at the target time step by performing the computation given by Equation (7) using the second variable $y_i$ at the previous time step and then calculate the second variable $y_i$ at the target time step by performing the computation given by Equation (6) using the intermediate variable $b_i$ and the first variable $x_i$ at the target time step.

The function computation circuit 86 may repeat the momentum update process using $FX(x_i)$ in Equation (6) and the position update process using $FY(y_i)$ in Equation (7) alternately a predetermined number of times, during the process in one time step. In this case, the function computation circuit 86 sets dt in $FX(x_i)$ and $FY(y_i)$ to a minute time $\delta t$ shorter than the time step. The momentum update process is a process of calculating the difference of momentum $\delta y_i$ after a minute time $\delta t$ by computing $FX(x_i)$ and adding the calculated difference of momentum $\delta y_i$ to the second variable $y_i$. The position update process is a process of calculating the difference of position $\delta x_i$ after a minute time $\delta t$ by calculating $FY(y_i)$ and adding the calculated difference of position $\delta x_i$ to the first variable $x_i$. In this case, the function computation circuit 86 repeats the momentum update process and the position update process, the number of times obtained by dividing dt by $\delta t$.

The function computation circuit 86 may set K in Equation (6) to 0 and limit the range of the first variable $x_i$ to within a predetermined range (for example, −1 through +1, both inclusive). The function computation circuit 86 may binarize the value of the first variable $x_i$ by the signum function $\mathrm{sgn}(x_i)$ in the computation at each time step.

At each time step, the postprocessing circuit 88 acquires M first variables $x_i$ and M second variables $y_i$ calculated by the function computation circuit 86. The postprocessing circuit 88 performs a predetermined computation process or a predetermined manipulation on each of M first variables $x_i$ and each of M second variables $y_i$. For example, at each time step, the postprocessing circuit 88 may perform a predetermined manipulation (for example, manipulations such as adding a predetermined value, multiplying a predetermined value, and adding or multiplying a random number) on one or both of M first variables $x_i$ and M second variables $y_i$ under a predetermined condition. The postprocessing circuit 88 need not perform any computation or manipulation on each of M first variables $x_i$ and each of M second variables $y_i$.

The postprocessing circuit 88 then stores M first variables $x_i$ at the target time step in the first memory 34. The postprocessing circuit 88 also stores M second variables $y_i$ at the target time step in the second memory 36.

Furthermore, the postprocessing circuit 88 supplies M first variables $x_i$ at the target time step to the transfer circuit 42. The postprocessing circuit 88 thus can supply the calculated M first variables $x_i$ to the other calculation cores 14 and the interaction circuit 38.

The function computation circuit 86 may multiply each of M first variables $x_i$ to be supplied to the transfer circuit 42 by c and $\Delta t$, before the interaction operation. The function computation circuit 86 thus can perform the process of multiplying dt×c in Equation (6), prior to the interaction operation.

Figure 31:
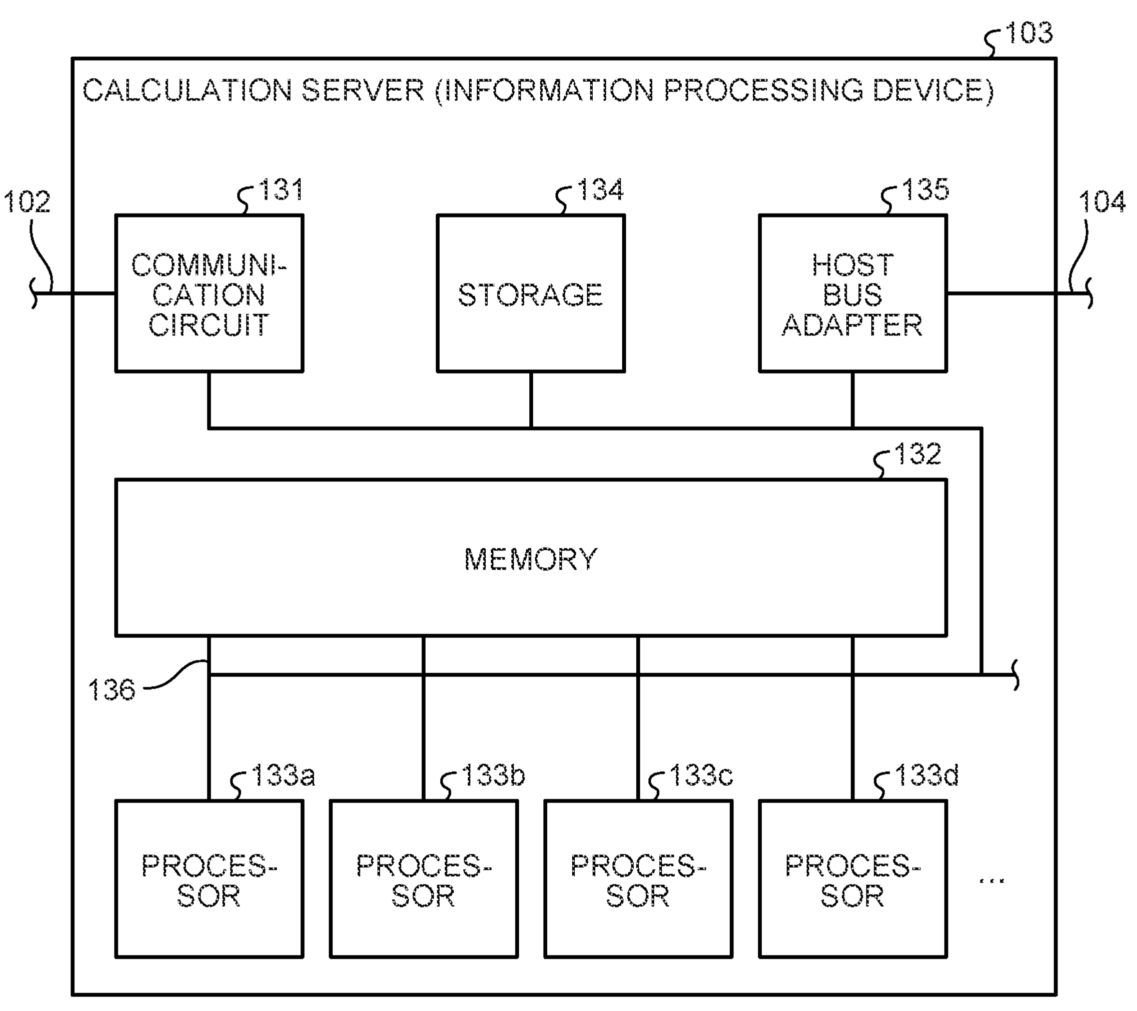
FIG. 31 is diagram illustrating a configuration of a calculation server.

FIG. 31 is a diagram illustrating a configuration of a calculation server 103. Each of P calculation cores 14 may be an information processing device such as the calculation server 103.

The calculation server 103 includes, for example, a communication circuit 131, a memory 132, processors 133*a* to 133*d*, a storage 134, and a host bus adapter 135. The communication circuit 131, the memory 132, the processors 133*a* to 133*d*, the storage 134, and the host bus adapter 135 are connected to each other through a bus 136.

The communication circuit 131 transmits/receives data to/from the devices connected to a network 102. The communication circuit 131 is, for example, a network interface card (NIC) for a wired LAN. However, the communication circuit 131 may be any other kind of communication circuit, such as a wireless LAN. The memory 132 is a memory accessible by the processors 133*a* to 133*d*. The memory 132 is, for example, a volatile memory such as a DRAM and an SRAM. The memory 132 may include any other kind of memory such as a nonvolatile memory. The processors 133*a* to 133*d* share data through the memory 132. The memory 132 is not necessarily configured with all of the memories of the calculation server 103. For example, some memories of the calculation server 103 may be local memories accessible only by any one of the processors 133*a* to 133*d*.

The processors 133*a* to 133*d* are electronic circuits that perform a calculation process. The processors 133*a* to 133*d* may be, for example, CPUs, GPUs, FPGAs, or ASICs, or may be a combination thereof. The processors 133*a* to 133*d* may be CPU cores or CPU threads. When the processors 133*a* to 133*d* are CPUs, the number of sockets included in the calculation server 103 is not limited. The processors 133*a* to 133*d* may be connected to any other components of the calculation server 103 through a bus such as PCI Express.

In the example in FIG. 31, the calculation server 103 includes four processors 133*a* to 133*d*. However, the number of processors included in one calculation server 103 is not limited to four.

The storage 134 stores a computer program for the calculation server 103 and a variety of data including data necessary for executing the computer program and data generated by the computer program. As used herein the computer program includes both an OS and an application. The storage 134 may be a volatile memory and a nonvolatile memory, or a combination thereof. The volatile memory is, for example, a DRAM or an SRAM. The nonvolatile memory is, for example, a NAND flash memory, an NOR flash memory, an ReRAM, or an MRAM. The storage 134 may include a hard disk, an optical disk, a magnetic tape, or an external storage device.

The host bus adapter 135 implements data communication with other calculation servers 103. The host bus adapter 135 is connected to a switch 105 through a cable 104. The host bus adapter 135 is, for example, a host channel adapter (HCA). The host bus adapter 135, the cable 104, and the switch 105 form an interconnection that can achieve a high throughput and thereby can improve the speed of parallel calculation processing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A calculation device configured to output a solution of an optimization problem with N discrete variables, where N is an integer equal to or greater than 2, the calculation device comprising:

P calculation cores each connected to a network, where P is an integer equal to or greater than 2 and less than N, wherein each of the P calculation cores is exclusively assigned with some of N virtual oscillators, each of the N virtual oscillators representing a virtual particle having one degree of freedom and being a simulation target, the N virtual oscillators correspond one-to-one with the N discrete variables and virtually change in position and momentum over time in one dimensional direction, the P calculation cores are configured to calculate N first variables representing the position and N second variables representing the momentum in the N virtual oscillators, sequentially for each of time steps from an initial time to an end time, the P calculation cores are configured to output values based on the N first variables at the end time as values based on the solution of the optimization problem, a kth calculation core among the P calculation cores, where k is an integer equal to or greater than 1 and less than P, is assigned with M virtual oscillators among the N virtual oscillators, where M is an integer equal to or greater than 1 and less than N, and at each of the time steps, is configured to calculate M first variables corresponding to the assigned M virtual oscillators among the N first variables and M second variables corresponding to the M virtual oscillators, the kth calculation core includes:

a receiving circuit configured to receive, at each of the time steps, N−M first variables at a previous time step calculated by P−1 calculation cores other than the kth calculation core among the P calculation cores, portion by portion sequentially, via the network;

an interaction circuit configured to calculate, at each of the time steps, M intermediate variables corresponding to the M virtual oscillators, based on the N first variables at the previous time step;

a time evolution circuit configured to calculate, at each of the time steps, the M first variables and the M second variables at a target time step, based on the M first variables at the previous time step, the M second variables at the previous time step, and the M intermediate variables; and a transmitting circuit configured to transmit, at each of the time steps, the M first variables calculated by the time evolution circuit to the P−1 calculation cores via the network, the interaction circuit includes an intermediate variable memory configured to store the M intermediate variables under calculation, at each of the time steps, the interaction circuit is configured to start calculation of the M intermediate variables before the receiving circuit completes reception of all of the N−M first variables at the previous time step, the intermediate variable memory includes M registers corresponding to the M intermediate variables, each of the M registers is written with a value under calculation in a corresponding intermediate variable, two or more registers among the M registers are connected in series to function as a shift register configured to transfer a stored value to an adjacent register in a series direction, or are arranged in a plurality of columns and connected for each column to function as a plurality of shift registers configured to transfer a stored value to an adjacent register in a series direction for each column, and the interaction circuit is configured to allow the two or more registers to function as the shift register or the shift registers to supply the M intermediate variables to the time evolution circuit.

2. The device according to claim 1, wherein at each of the time steps, the interaction circuit is configured to:

acquire some of the N first variables at the previous time step portion by portion sequentially;

every time acquiring the some of first variables, perform product-sum operation of some of coupling coefficients corresponding to the acquired some of first variables in a preset M×N submatrix and the acquired some of first variables, row by row; and every time acquiring the some of first variables, cumulatively add each of computation results of product-sum operation for each row to a corresponding intermediate variable among the M intermediate variables stored in the intermediate variable memory, and at each of the time steps, the interaction circuit is configured to start computation using some of first variables among the N first variables at the previous time step before the receiving circuit completes reception of all of the N−M first variables at the previous time step.

3. The device according to claim 2, wherein the kth calculation core further includes a coefficient memory configured to store the preset M×N submatrix.

4. The device according to claim 2, wherein the kth calculation core further includes:

a first memory configured to store the M first variables; and a second memory configured to store the M second variables, and at each of the time steps, the time evolution circuit is configured to update the M first variables stored in the first memory and update the M second variables stored in the second memory.

5. The device according to claim 2, wherein at each of the time steps, the interaction circuit is configured to output the M intermediate variables to the time evolution circuit after completing product-sum operation corresponding to last some of first variables among the N first variables.

6. The device according to claim 5, wherein at each of the time steps, the interaction circuit is configured to erase the M intermediate variables stored in the intermediate variable memory before starting computation using initial some of first variables.

7. The device according to claim 1, wherein
in a communication period in which the N first variables at each time step are transmitted and received, each of the P calculation cores is assigned with one time slot among a plurality of time slots obtained by dividing the communication period, and
the transmitting circuit is configured to broadcast the calculated M first variables to the P−1 calculation cores via the network in the assigned time slot.

8. The device according to claim 7, wherein
the receiving circuit is configured to receive the M first variables calculated by the time evolution circuit via the network, and
at each of the time steps, the interaction circuit is configured to acquire all of the N first variables at the previous time step sequentially from the receiving circuit.

9. The device according to claim 7, wherein
the kth calculation core further includes a first multiplexer configured to time-multiplex and supply the M first variables calculated by the time evolution circuit and the N−M first variables received by the receiving circuit to the interaction circuit, and
at each of the time steps, the interaction circuit is configured to acquire all of the N first variables at the previous time step sequentially from the first multiplexer.

10. The device according to claim 1, wherein
the network connects the P calculation cores by one or more ring networks, and
the P calculation cores are configured to transmit and receive N first variables Xi portion by portion in a bucket-brigade fashion, in a communication period in which the N first variables Xi at each time step are transmitted and received.

11. The device according to claim 10, wherein
the kth calculation core further includes a second multiplexer configured to time-multiplex and supply the M first variables calculated by the time evolution circuit and the N−M first variables received by the receiving circuit to the transmitting circuit,
the receiving circuit is configured to receive all of the N first variables at the previous time step via the network, and
at each of the time steps, the interaction circuit is configured to acquire all of the N first variables at the previous time step sequentially from the receiving circuit.

12. The device according to claim 10, wherein
the kth calculation core further includes a third multiplexer configured to time-multiplex and supply the M first variables calculated by the time evolution circuit and the N−M first variables received by the receiving circuit to the transmitting circuit, and
at each of the time steps, the interaction circuit is configured to acquire the N first variables at the previous time step sequentially from the third multiplexer.

13. The device according to claim 1, wherein the interaction circuit further includes an aggregation circuit configured to time-divisionally aggregate and supply the M intermediate variables stored in the intermediate variable memory to the time evolution circuit, at each of the time steps.

14. The device according to claim 1, wherein
the M registers are connected in series to function as the shift register, or are arranged in a plurality of columns and connected for each column to function as the plurality of shift registers, and
the interaction circuit is configured to allow the M registers to function as the shift register or the shift registers to supply the M intermediate variables to the time evolution circuit.

15. The device according to claim 1, wherein each of the P calculation cores is implemented in a semiconductor device.

16. The device according to claim 15, wherein the network includes a bus shared by the P calculation cores.

* * * * *